US011553526B2

(12) United States Patent
Lou et al.

(10) Patent No.: US 11,553,526 B2
(45) Date of Patent: Jan. 10, 2023

(54) RECEIVER ASSISTED TRANSMISSIONS IN NRU

(71) Applicant: IDAC HOLDINGS, INC., Wilmington, DE (US)

(72) Inventors: Hanging Lou, Syosset, NY (US); Ahmad Reza Hedayat, Aliso Viejo, CA (US); Li-Hsiang Sun, San Diego, CA (US); Oghenekome Oteri, San Diego, CA (US); Rui Yang, Greenlawn, NY (US)

(73) Assignee: IDAC HOLDINGS, INC., Wilmington, DE (US)

( * ) Notice: Subject to any disclaimer, the term of this patent is extended or adjusted under 35 U.S.C. 154(b) by 70 days.

(21) Appl. No.: 17/265,863

(22) PCT Filed: Aug. 8, 2019

(86) PCT No.: PCT/US2019/045749
§ 371 (c)(1),
(2) Date: Feb. 4, 2021

(87) PCT Pub. No.: WO2020/033721
PCT Pub. Date: Feb. 13, 2020

(65) Prior Publication Data
US 2021/0204322 A1 Jul. 1, 2021

Related U.S. Application Data

(60) Provisional application No. 62/716,240, filed on Aug. 8, 2018.

(51) Int. Cl.
*H04W 74/08* (2009.01)
*H04W 72/04* (2009.01)
*H04W 74/00* (2009.01)

(52) U.S. Cl.
CPC ... *H04W 74/0816* (2013.01); *H04W 72/0446* (2013.01); *H04W 74/004* (2013.01); *H04W 74/0875* (2013.01)

(58) Field of Classification Search
CPC ......... H04W 74/0816; H04W 72/0446; H04W 74/004; H04W 74/0875
See application file for complete search history.

(56) References Cited

U.S. PATENT DOCUMENTS 6,405,050 B1 * 6/2002 Amirijoo ................ H04W 4/08
455/518
10,129,908 B2 11/2018 Kwon et al.
(Continued)

FOREIGN PATENT DOCUMENTS

| GB | 2 542 819 | 4/2017 |
| WO | 2016/119281 | 8/2016 |
| WO | 2016/120436 | 8/2016 |

OTHER PUBLICATIONS

"RAN1 Chairman's Notes," 3GPP TSG RAN WG1 Meeting #92, Athens, Greece (Feb. 26-Mar. 2, 2018).
(Continued)

*Primary Examiner* — Christine Ng
(74) *Attorney, Agent, or Firm* — Volpe Koenig

(57) ABSTRACT

Receiver assisted channel access may be used during a channel occupancy time (COT). A wireless transmit/receive unit (WTRU) that is a member of a first group may receive a preamble in a first time slot set, and determine a group associated with the first time slot. On a condition that the group associated with the first time slot set is the first group, the WTRU may monitor the channel for a request-to-send (RTS) signal in the first slot set. On a condition that the RTS signal is received, the WTRU may perform listen-before-talk (LBT) on the channel. On a condition that the LBT is successful, the WTRU may transmit a clear-to-send (CTS)
(Continued)

on the channel and access the channel in the first time slot. On a condition that the LBT is unsuccessful, the WTRU may not access the channel in the first time slot set.

20 Claims, 12 Drawing Sheets

(56) References Cited

U.S. PATENT DOCUMENTS

| | | | | |
|---|---|---|---|---|
| 2014/0301330 | A1* | 10/2014 | Lee | H04W 74/0833 370/329 |
| 2016/0227571 | A1* | 8/2016 | Baek | H04W 52/0206 |
| 2017/0290048 | A1 | 10/2017 | Amuru et al. | |
| 2018/0317259 | A1* | 11/2018 | Islam | H04W 74/0816 |
| 2019/0182866 | A1* | 6/2019 | Li | H04W 74/0808 |
| 2019/0335504 | A1* | 10/2019 | Chakraborty | H04W 16/14 |
| 2020/0163128 | A1* | 5/2020 | Pang | H04W 74/00 |

OTHER PUBLICATIONS

"RAN1 Chairman's Notes," 3GPP TSG RAN WG1 Meeting 90bis, Prague, CZ (Oct. 9-13, 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Channel access in NR-U," 3GPP TSG RAN WG1 #96bis, R1-1904853, Xi'an, China (Apr. 8-12, 2019).
Interdigital Inc., "Channel access procedure and coexistence in NR-U," 3GPP TSG RAN WG1 Meeting #94bis, R1-1811204, Chengdu, China (Oct. 8-12, 2018).
Interdigital Inc., "Channel access procedure and coexistence in NR-U," 3GPP TSG RAN WG1 Meeting #95, R1-1813220, Spokane, USA (Nov. 12-16, 2018).
Interdigital Inc., "Channel access procedures and coexistence in NR-U," 3GPP TSG RAN WG1 Ad-Hoc Meeting 1901, R1-1900786, Taipei, Taiwan (Jan. 21-25, 2019).
Interdigital Inc., "Contention window adjustment and coexistence in NR-U," 3GPP TSG RAN WG1 #96, R1-1902587, Athens, Greece (Feb. 25-Mar. 1, 2019).
Qualcomm, "New SID on NR-based Access to Unlicensed Spectrum," 3GPP TSG RAN Meeting #75, RP- 170828, Dubrovnik, Croatia (Mar. 6-9, 2017).
Qualcomm, "Radio Access Design," 5G Workshop on NR-Unlicensed and Shared Spectrum, San Diego, CA (Oct. 3-4, 2018).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.2.0 (Jun. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.6.0 (Jun. 2019).
Third Generation Partnership Project, "Technical Specification Group Radio Access Network; NR; Multiplexing and channel coding (Release 15)," 3GPP TS 38.212 V1.0.0 (Sep. 2017).
Third Generation Partnership Project, "Technical Specification Group Radio Access Network; NR; Multiplexing and channel coding (Release 15)," 3GPP TS 38.212 V15.2.0 (Jun. 2018).
Third Generation Partnership Project, "Technical Specification Group Radio Access Network; NR; Multiplexing and channel coding (Release 15)," 3GPP TS 38.212 V15.6.0 (Jun. 2019).
Nokia et al., "Frame structure for NR-U operation," 3GPP TSG RAN WG1 Meeting #93, R1-1806105, Busan, Korea (May 21-25, 2018).

* cited by examiner

RECEIVER ASSISTED TRANSMISSIONS IN NRU

CROSS-REFERENCE TO RELATED APPLICATIONS

This application is the U.S. National Stage, under 35 U.S.C. § 371, of International Application No. PCT/US2019/045749 filed Aug. 8, 2019, which claims the benefit of U.S. Provisional Application No. 62/716,240 filed Aug. 8, 2018, the contents of which are incorporated herein by reference.

BACKGROUND

Recent Third Generation Partnership Project (3GPP) standards discussions define several deployment scenarios such as indoor hotspot, dense urban, rural, urban macro, and high speed. Based on general requirements set out by International Telecommunication Union Radio communication Sector (ITU-R), Next Generation Mobile Networks (NGMN) and 3GPP, a broad classification of the use cases for emerging Fifth Generation (5G) New Radio (NR) systems may be classified as enhanced mobile broadband (eMBB), massive machine type communications (mMTC) and ultra-reliable and low latency communications (URLLC). These use cases focus on meeting different performance requirements such as higher data rate, higher spectrum efficiency, low power and higher energy efficiency, and/or lower latency and higher reliability. NR-based access to unlicensed spectrum is part of the New Radio Unlicensed (NR-U or NRU) study item. NR-U is concerned with NR numerology on unlicensed spectrum, including sub 6 GHz and above 6 GHz unlicensed bands (e.g., 5 GHz, 37 GHz, 60 GHz).

Licensed Assisted Access (LAA) was introduced in 3GPP release 13 (R13) as part of LTE Advanced Pro. LAA may use LTE carrier aggregation (CA) technology to aggregate carriers across licensed and unlicensed bands, and includes downlink (DL) LAA operation. Enhanced LAA (eLAA), introduced in 3GPP release 14 (R14), and further enhanced LAA (feLAA), introduced in 3GPP release 15 (R15), include UL LAA operation. In NR-U, scenarios may be considered where NR Licensed Assisted Access (NR-LAA) is anchored to an LTE carrier by dual-connectivity (DC) as well as carrier aggregation (CA) with a 5G NR anchor channel (e.g., a channel to carry control and configuration information). NR-U may also consider standalone operation of NR in unlicensed spectrum.

SUMMARY

Methods and apparatus may be used for receiver assisted channel access during a channel occupancy time (COT), where channels may include licensed and unlicensed spectrum. A wireless transmit/receive unit (WTRU) may determine that the WTRU is a member of a first group. The WTRU may receive a first preamble in a first time slot set of the COT, and determine a group associated with the first time slot set based on the first preamble. On a condition that the group associated with the first time slot set is the first group, the WTRU may monitor the channel for a first request-to-send (RTS) signal in the first slot set. In a condition that the first RTS signal is received, the WTRU may perform a first listen-before-talk (LBT) on the channel. On a condition that the first LBT is successful, the WTRU may transmit a first clear-to-send (CTS) on the channel and access the channel in the first time slot for uplink or downlink communications. On a condition that the first LBT is unsuccessful, the WTRU may not the channel in the first time slot set and may monitor the channel for another preamble in a subsequent time slot set in the COT. The WTRU may enter a power saving mode when not monitoring or accessing the channel.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
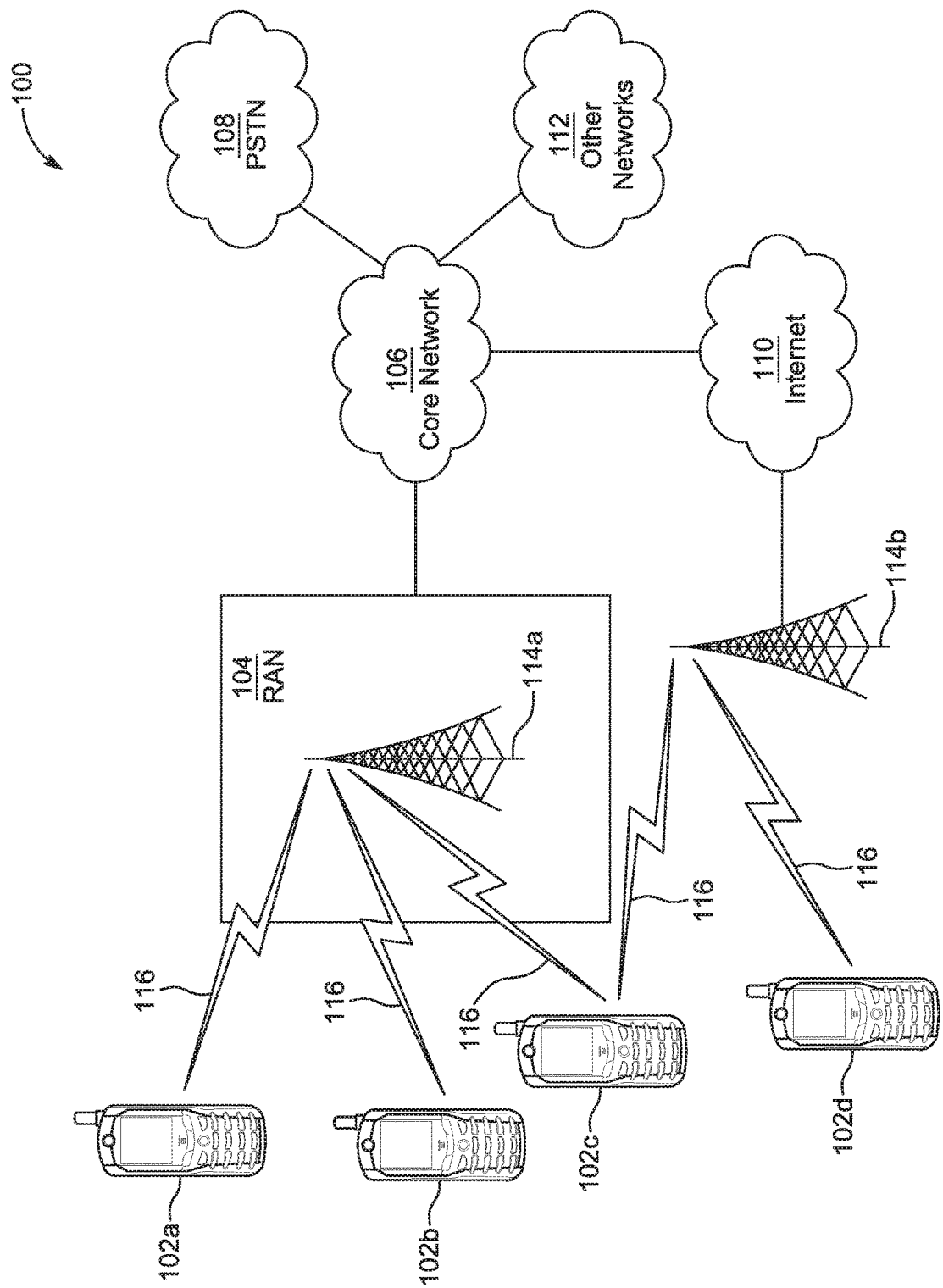
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
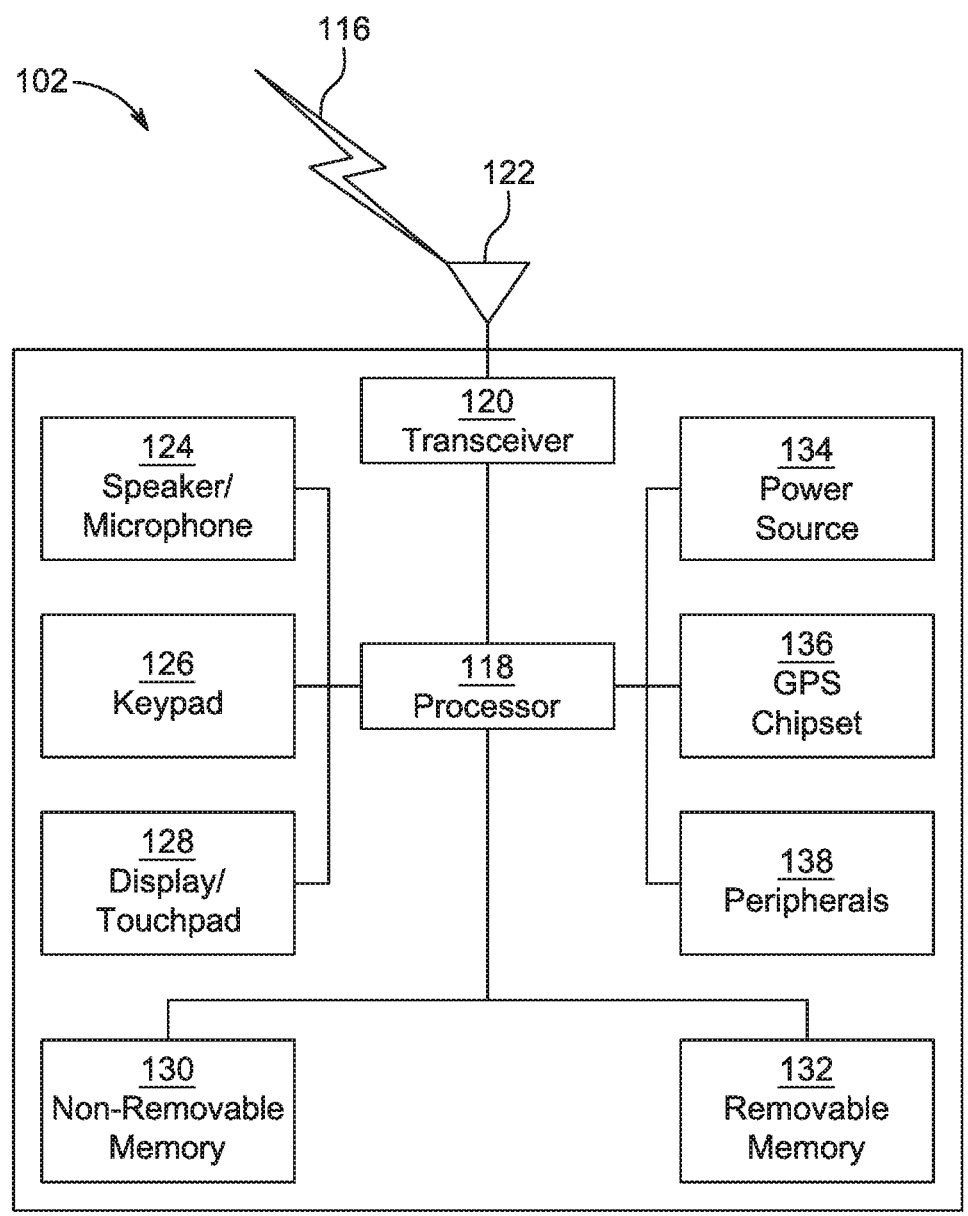
FIG. 1B is a system diagram illustrating an example wireless transmit/receive unit (WTRU) that may be used within the communications system illustrated in FIG. 1A according to an embodiment.
Figure 1C:
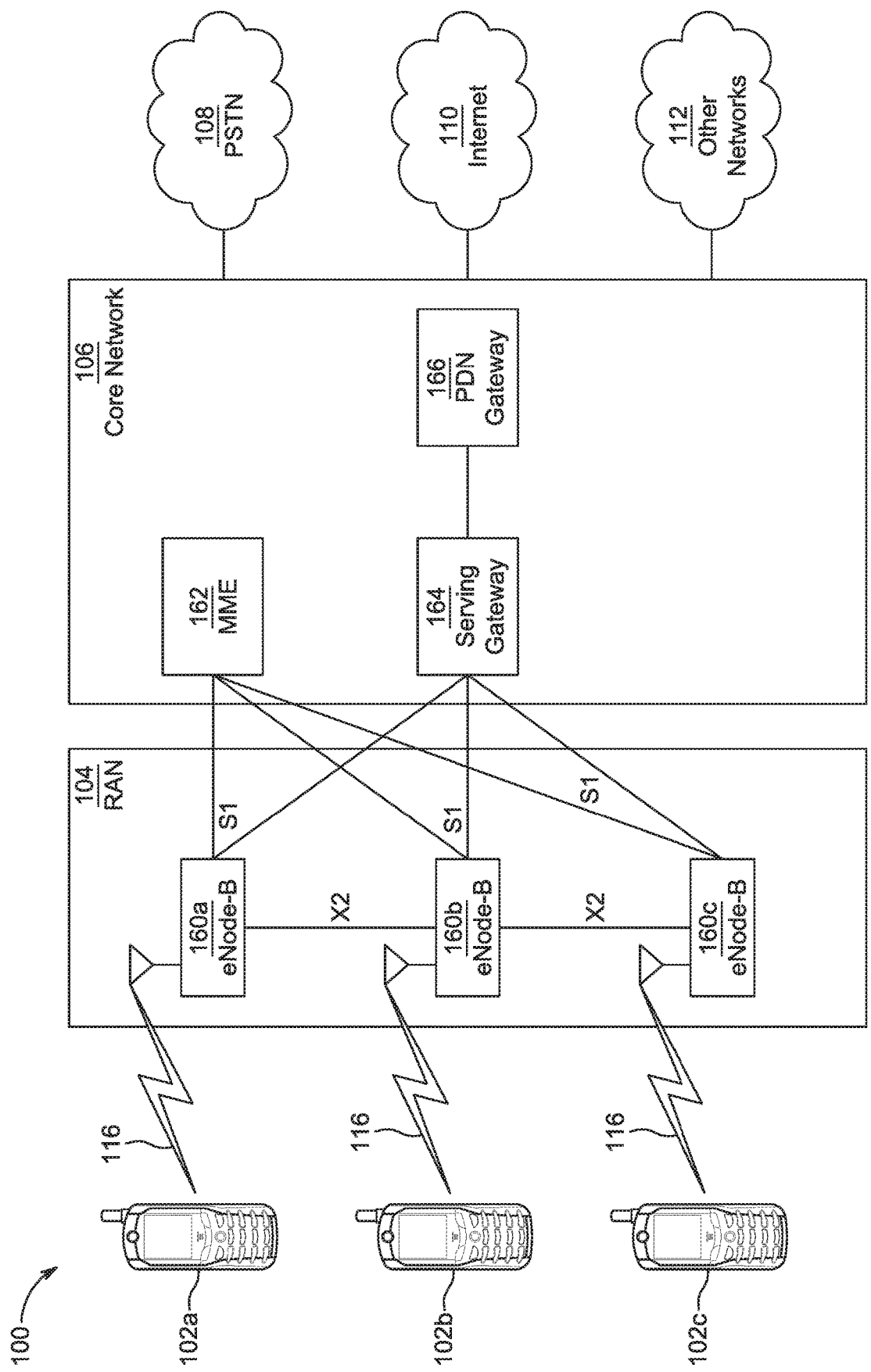
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
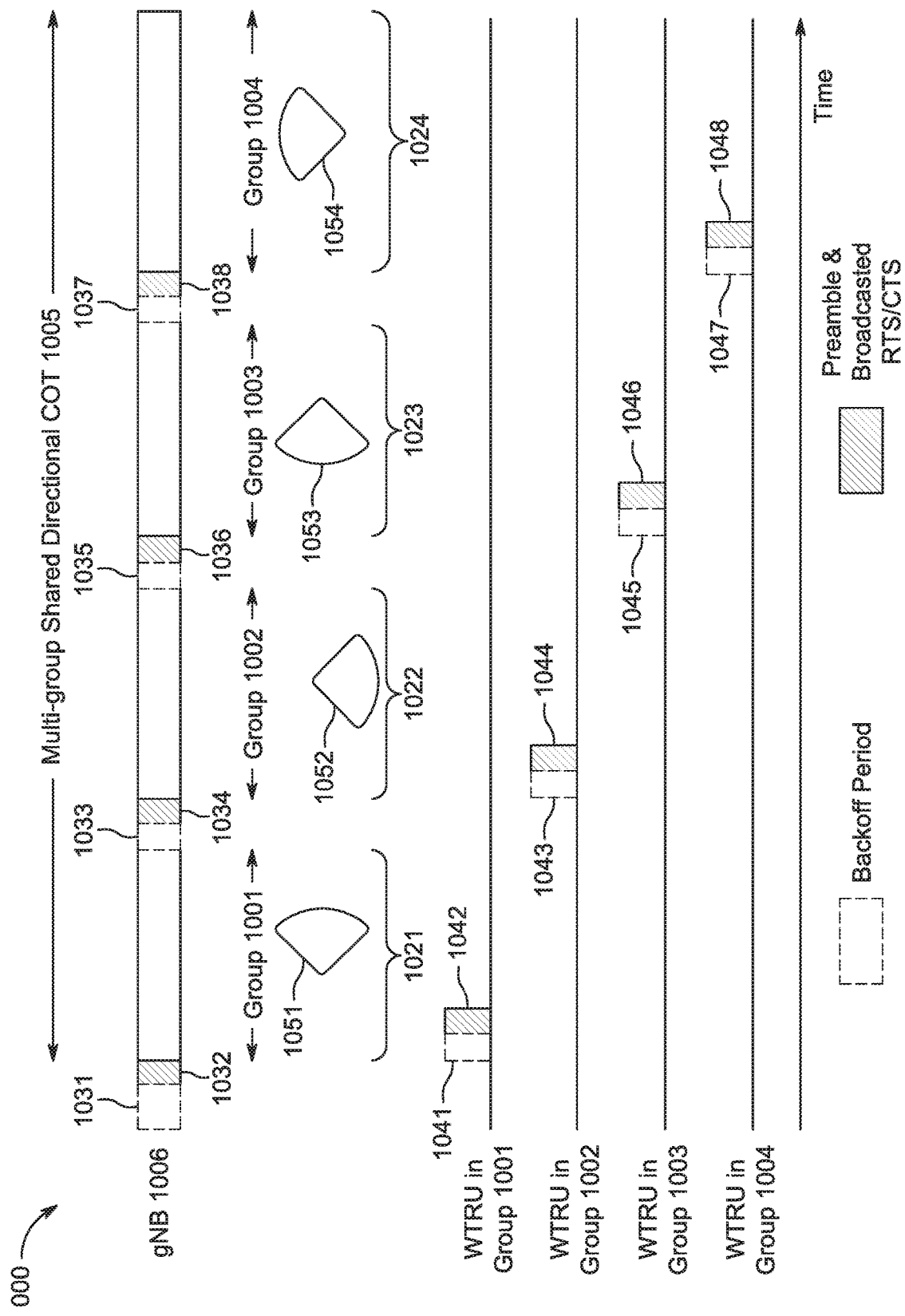
FIG. 10 shows a signaling diagram of an example group-based receiver assisted channel access procedure of a group-based shared channel occupancy time (COT) with antenna directions/sectors.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
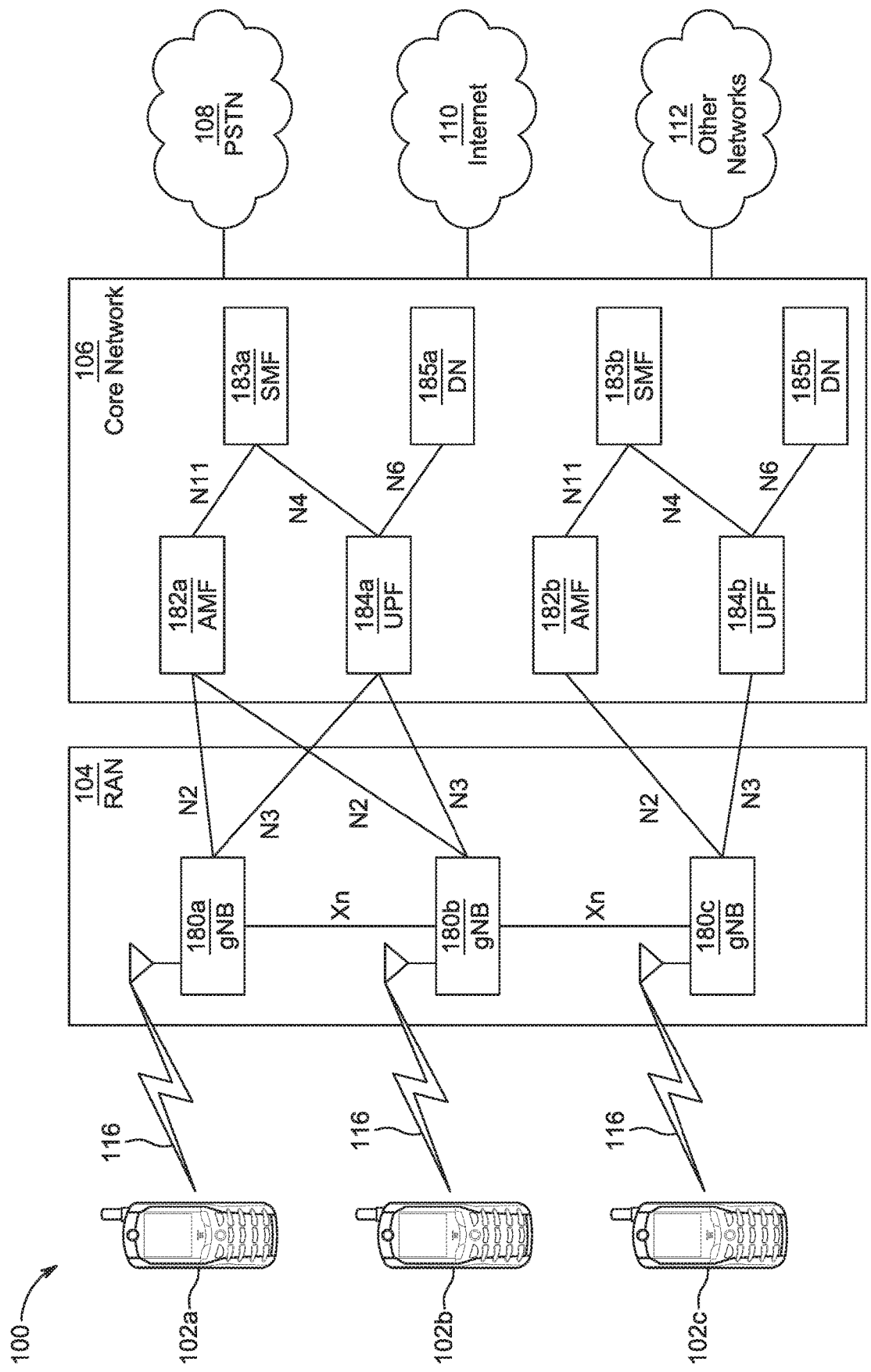
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Listen before talk (LBT) protocols, where the transmitting entity senses the radio channel before starting a transmission, may be implemented in LAA. In an example, in category 1 LBT, no LBT procedures may be performed by the transmitting entity. In category 2 LBT, LBT may be implemented without random back-off. The duration of time that the channel is sensed to be idle before the transmitting entity transmits may be deterministic. In category 3 LBT, LBT may be implemented with random back-off with a contention window of fixed size. In this case, as part of the LBT procedure, the transmitting entity may draw a random number N within a contention window. The size of the contention window may be specified by the minimum and maximum value of N. The size of the contention window may be fixed. The random number N may be used in the LBT procedure to determine the duration of time that the channel is sensed to be idle before the transmitting entity transmits on the channel.

In category 4 LBT, LBT may be implemented with random back-off with a contention window of variable size. In this case, as part of the LBT procedure, the transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

In the case where a device may perform random back-off, different channel access priority classes and corresponding parameters may be defined, as described in Table 1. With reference to Table 1, p is the priority class index. The defer duration $T_d$ consists of duration $T_f=16$ μs immediately followed by $m_p$ consecutive slot durations, where each slot duration is $T_{sl}=9$ μs. $CW_{min,p}$ and $CW_{max,p}$ respectively define the minimum and maximum size of the contention window for a given priority class, and $CW_p$, is the contention window for a given priority class. The channel occupancy time (COT) may refer to the continuous transmission time after channel sensing (e.g., for LBT). The eNB may not continuously transmit on a carrier on which the LAA secondary cell(s) (Scell(s)) transmission(s) are performed, for a period exceeding $T_{m,cot,p}$.

TABLE 1

Example Channel Access Priority Classes and Parameters

| Channel Access Priority Class (p) | $m_p$ | $CW_{min,p}$ | $CW_{max,p}$ | $T_{m,cot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127, 255,511,1023} |

Shared COT transmissions may be implemented. For example, the eNB may acquire the channel by category 4 LBT and share it with WTRUs for uplink (UL) transmissions. In this scenario, category 2 LBT may be used prior to the UL transmission.

In 5G NRU, self-contained TXOP may be considered. For example, a mechanism with two stage TXOP may be implemented. The first stage may be a preparation stage for channel contention and reservation, and the second stage may be used for data transmission.

In an example, the eNB may allow autonomous uplink (AUL) within the eNB-acquired shared COT in subframes belonging to the UL subframes indicated by the common physical downlink control channel (C-PDCCH) if the COT is acquired using the largest priority class value.

Enabling or disabling of AUL transmissions within an eNB shared COT may be indicated via 1-bit field in C-PDCCH. For example, if an eNB indicates that sharing is allowed, then for AUL transmissions the WTRU may send data corresponding to any priority class during the UL subframes indicated by the C-PDCCH. If an eNB indicates sharing is disabled, the WTRU may not transmit AUL during the UL subframes indicated by the C-PDCCH. Any or all UL subframes indicated by C-PDCCH within a single eNB-acquired shared COT may be contiguous (i.e., short gaps, for example up to 2 symbols, between subframes may be allowed similar to (e)LAA). AUL transmissions of a WTRU within the shared COT may also be contiguous (i.e. short gaps, for example up to 2 symbols, between subframes may be allowed similar to (e)LAA). AUL in FeLAA may use Type 2 channel access (e.g., with 25 μs LBT). An AUL transmission started within the subframes belonging to the UL subframes indicated in the C-PDCCH may not continue beyond the last indicated UL subframe. DL-UL-DL switch may not be allowed within a single COT. All subframes (e.g., both scheduled and AUL) belonging to the UL subframes indicated by the C-PDCCH may be counted towards eNB COT, irrespective of whether an UL transmission occurs or not. When there is no physical downlink shared channel (PDSCH) transmission in the COT, AUL transmissions within an eNB shared COT may be disabled via an indication in the C-PDCCH.

A COT acquired, for example using category 4 LBT, by a WTRU for AUL transmission may be shared with the eNB. To utilize the COT acquired by the WTRU, the eNB may send DL control information, such as an AUL downlink feedback indication (AUL-DFI) or UL grant, to the WTRU that acquired the COT within the remaining COT. For DL transmission within the WTRU-acquired COT, the DL transmission may have a partial ending subframe (i.e., ending at a symbol in the subframe instead of the subframe boundary) of up to 2 OFDM symbols (OS) in length. The eNB may send control information to any WTRU. The last symbol of the AUL burst may be dropped. The eNB may use the same LBT procedure as for demodulation reference signals (DRS). Cycle prefix (CP) extension up to 1OS-25 μs may be transmitted by the eNB before the start of the DL transmission within the WTRU-acquired COT. UL-DL-UL sharing may not be permitted within a single COT.

Single and multiple DL to UL and/or UL to DL switching within a shared gNB COT may be supported. LBT conditions to support single or multiple switching points may include, but are not limited to include, any of the following example conditions. In an example condition, for a gap of less than 16 μs, no-LBT may be used. Restrictions and/or conditions on when a no-LBT option may be used may be further identified in consideration of fair coexistence. In an example condition, for gap of between 16 µs and 25 µs, one-shot LBT may be used. Restrictions and/or conditions on when a one-shot LBT option may be used may be further identified in consideration of fair coexistence. In an example condition, for a single switching point, for a gap from DL transmission to UL transmission exceeding 25 µs, one-shot LBT may be used. One or more one-shot LBT attempts may be allowed for granted UL transmission. In an example condition, for multiple switching points, for the gap from DL transmission to UL transmission exceeds 25 µs, one-shot LBT may be used, and may have associated regulations.

In NRU, enhancements to LBT mechanisms may include, but are not limited to, techniques to cope with directional antennas/transmissions, receiver assisted LBT (e.g., request-to-send/clear-to-send (RTS/CTS) type mechanism), on-demand receiver assisted LBT (e.g., receiver assisted LBT enabled only when needed), techniques to enhance spatial reuse, preamble detection, and enhancements to baseline LBT mechanisms above 7 GHz.

In general, in an unlicensed band, receiver assisted transmission may protect transmitter and receiver from interference transmissions by hidden nodes. Additionally, receiver assisted transmission may protect existing transmissions by other devices from interference of the devices directly involved in the receiver assisted transmission. Moreover, receiver assisted transmission may allow the WTRU to report whether the WTRU is available for reception/transmission. In order to fulfill all or part of the goals mentioned above, an RTS/CTS like transmission may be broadcasted and understood by all the nodes nearby. In NRU, mechanisms may be used to enable such receiver assisted transmissions, for example in UL transmission.

In downlink (DL) data transmission, CTS like transmissions in the UL may need to be understood by the serving gNB and also neighboring gNBs. There is no guarantee that all the gNBs are synchronized perfectly. Moreover, a WTRU may estimate its timing advance to its serving gNB but not the non-serving gNBs. Therefore, non-serving gNBs may have difficulties to understand transmission from the WTRU. The problem may be more significant when multiple WTRUs are transmitting CTS concurrently using the same time slot.

NRU transmission with carrier aggregation (CA) may be supported. It may be possible that the primary cell (Pcell) is in a licensed band and a secondary cell (Scell) is in unlicensed band. Mechanisms may be used to perform receiver assisted LBT and/or utilize multiple carriers to achieve receiver assisted LBT with CA. Shared COT transmission with one or more DL/UL switches may be supported in NRU. Mechanisms may be used to perform receiver assisted LBT in shared COT and/or providing flexible COT sharing and access among all of the WTRUs.

Any of the following example mechanisms may be used to perform receiver assisted transmission, for example in NRU. Transmitted RTS/CTS like signals may be decoded by both intended and unintended devices so that unintended devices may notice the upcoming transmission and then silence themselves for the corresponding durations. The intended WTRU may notice the upcoming transmission duration too. The RTS/CTS like signals may be transmitted using a broadcast channel, such as physical broadcast channel (PBCH), or other broadcast channel, so that all the WTRUs may monitor the transmission of the RTS/CTS like signal. To reduce the monitoring occasions for RTS/CTS like signals, an RTS/CTS signal may be transmitted right after a predefined or predetermined reference signal, which may be referred to as a preamble. For example a Channel Reservation Request (CRreq) and Channel Reservation Response (CRresp) may be used to indicate the RTS/CTS like signal, respectively. As used herein, RTS/CTS may be used interchangeably with CRreq/CRresp. In an example, there may be predefined/predetermined CRreq/CRresp monitoring window associated with CRreq and/or CRresp transmissions. In another example, the CRreq/CRresp monitoring window may be triggered by the detection of the preamble (e.g., a predetermined reference signal).

Figure 2:
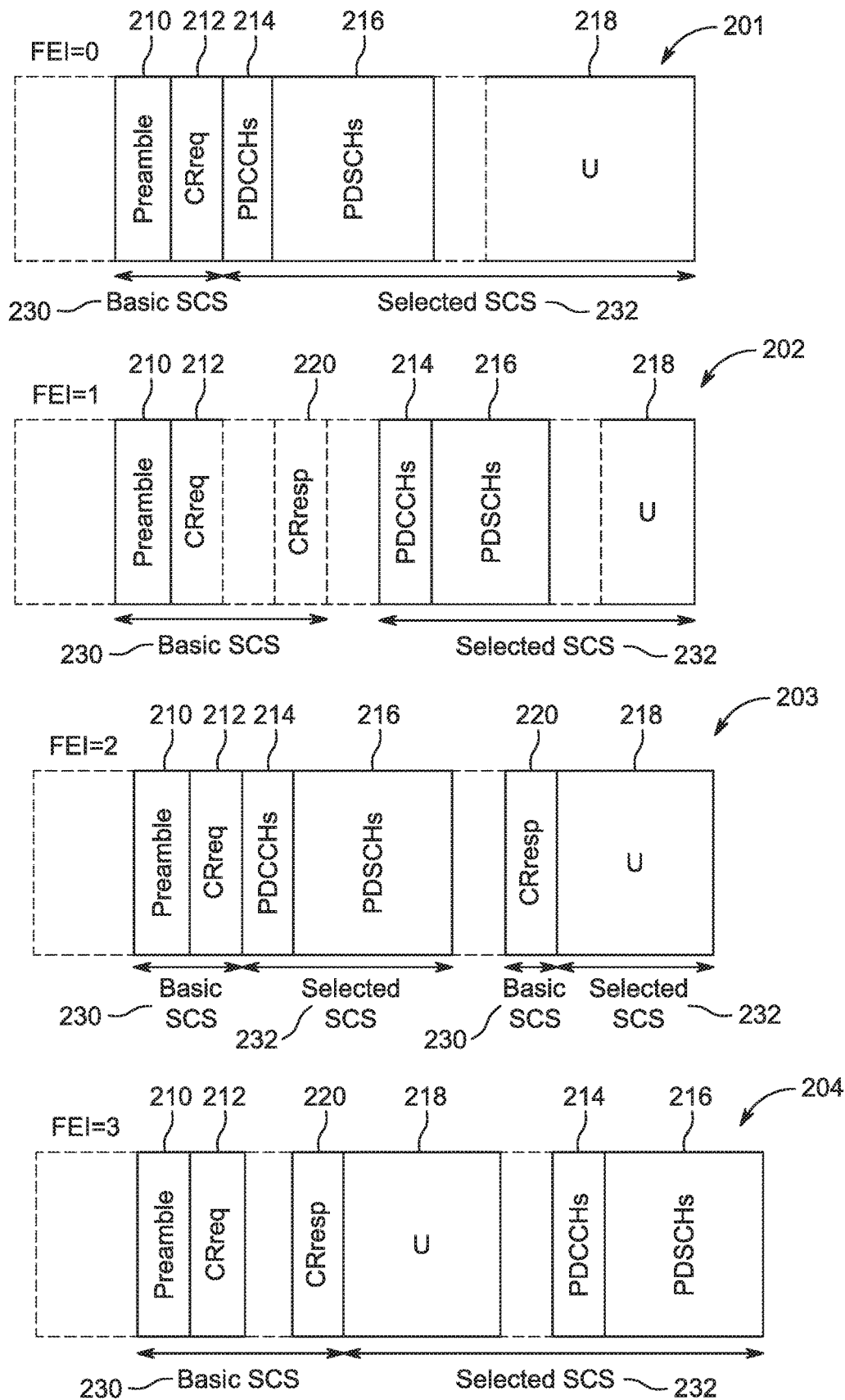
FIG. 2 shows example channel reservation frame formats that may be used as part of receiver assisted transmission.

FIG. 2 shows example channel reservation frame formats 201, 202, 203 and 204 that may be used as part of receiver assisted transmission. A channel reservation frame according to any of the example frame formats 201, 202, 203 and 204 may include, but is not limited to include, any one or more of the following signals: a preamble 210 (DL and/or UL), a CRreq signal 212 (DL and/or UL), PDCCH(s) 214 (DL), PDSCH(s) 216 (DL), PUCCH(s) and/or PUSCH(s) 218 (UL), and/or a CRresp signal 220 (DL and/or UL). In an example, CRreq signal 212 and/or CRresp signal 220 may be carried in PDCCH(s) 214 in the DL or PUCCH(s) 218 in the UL. In the example frame formats 201, 202, 203 and 204, a gNB may acquire channel(s) over an unlicensed channel and may start a COT by transmitting a preamble signal 210. The preamble 210 may be transmitted in the DL over the full frequency bandwidth or partial frequency bandwidth. The CRreq 212 may be transmitted in the DL right after the preamble 210. In an example, the CRreq signal 212 may be encoded using the lowest modulation and coding rate and transmitted together with a demodulation reference signal (DMRS). The CRreq signal 212 may be decoded and the channel estimation may be performed using the DMRS transmitted with the CRreq 212. The CRreq signal 212 may include, but is not limited to include, any one or more of the following information: one or more fast exchange indication(s) (FEI) fields; duration field; WTRU ID field; resource allocation for CRresp field; selected subcarrier spacing (SCS) field; and/or cell ID field. The FEI field may indicate whether and when the CRresp signal 220 may need to be transmitted in the UL from WTRU(s). The duration field may indicate the expected transmission duration for the COT. The unintended WTRUs that detect the transmission of the CRreq signal 212 and/or CRresp signal 220 and may defer their potential or intended transmissions to the end of the COT and/or may switch to sleeping mode to save power. In an example, the duration information may be broadcasted in a dedicated resource so that all devices listening to the medium may be able to detect it and may notice the duration of the upcoming COT and defer their own transmissions accordingly.

The WTRU ID field may be implicitly carried by scrambling in the CRC field or the DMRS, or may be explicitly included in the CRreq signal 212. For example, the WTRU ID may be a broadcast ID that all the WTRUs and gNBs may be able to detect as part of the CRreq signal 212. In another example, the WTRU ID may be a groupcast/multicast ID that all the WTRUs and gNBs in the group may be able to detect as part of the CRreq signal 212. In another example, the WTRU ID may be a WTRU-specific ID, so that the CRreq signal 212 may be for the WTRU (e.g., not broadcasted). In an example, depending on the type of the WTRU ID (i.e., broadcast/multicast or unicast ID), the format of the CRreq signal 212 may be different, or some fields in the CRreq signal 212, such as the resource allocation field, may be different. In another example, more than one WTRU ID may be carried in the CRreq signal 212. For example, a broadcast WTRU ID may be carried such that all the WTRUs/gNBs may be able to detect the signal (e.g., the broadcast WTRU ID may be used to scramble the CRC field or the DMRS field), and a unicast or multicast WTRU ID may be carried explicitly or implicitly to indicate the intended receiver of the CRreq signal 212.

Resource allocation for the CRresp signal (or CRresp field carried in a PUCCH or other control or data channel) may be included in the CRreq signal 212 to safeguard against the case where multiple WTRUs may transmit UL CResp signals 220 concurrently using the same set of OFDM symbols. Any of the following example methods may be used to signal the resource allocation for the CRresp field. In one example, the resource allocation for the CRresp field may contain a type of WTRU ID and corresponding frequency allocation such that the WTRU may use the frequency resources. In another example, possible resource allocation set/table may be predefined/predetermined or signaled by higher layer signaling. A resource allocation set/table index may be indicated in CRreq (i.e., in the resource allocation for the CRresp field) so that the WTRU may know the allocated resource to transmit CRresp 220. A special index may be allocated to one WTRU to transmit CRresp 220. In another example, a groupcast ID may be used to indicate a group of WTRUs that may transmit the CRresp 229. The group of WTRUs are ordered when the group may be formed and each WTRU may know its order index. In the resource allocation for the CRresp field, the gNB may include a list of resource sets. Each WTRU may use its order index to locate an entry in the resource set. The corresponding resource may be used by the WTRU to transmit the CRresp 220.

The SCS field in the CRreq signal 212 may indicate which SCS may be used in DL and/or UL control and/or data transmission. In this case, the control/data transmission may not include the preamble signal 210, CRreq signal 212 and/or CRresp signal 220. The cell ID field in the CRreq signal 212 may be implicitly or explicitly carried. In an example, a compressed or simplified cell ID may be used. The compressed or simplified cell ID may be locally unique such that a device may know if the transmission is in its serving cell or a neighboring cell.

In another example, the CRresp signal 220 may use the same physical layer settings as the CRreq signal 212, in which case no extra signalling may be needed to transmit the CRresp signal 220. Otherwise, in the CRreq signal 212, any of the following example physical layer settings to transmit the CRresp signal 220 may be carried: antenna pots, number of layers, DMRS format, and/or modulation and coding scheme (MCS).

As shown the example channel reservation frame formats 201, 202, 203 and 204, different FEI values may be used (and signalled in the FEI field of the CRreq signal 212). For example, FEI=0 may indicate the frame exchanges according to channel reservation frame formats 201 where no CRresp is used. In the case of channel reservation frame formats 201, PDCCHs 214 and PDSCHs 216 in the DL may follow the transmission of the CRreq signal 212 in the DL. A WTRU (or multiple WTRUs) may perform LBT from the end of DL transmissions (i.e., after the transmission of CRreq signal 212, PDCCHs 214, and PDSCHs 216), and start UL transmissions 218 if LBT is successful (i.e., no transmission is sensed on the channel). In an example, LBT may not be performed under certain conditions in the UL.

In another example, FEI=1 may indicate the frame exchanges according to channel reservation frame formats 202. After the transmission of CRreq signal 212, A WTRU (or WTRUs) may perform LBT with fixed duration, LBT with random back off or no LBT, then the WTRU may transmit CRresp signal 220 in the allocated resources. The gNB, on reception of the CRresp signal 220, may perform LBT with fixed duration, LBT with random back off or no LBT, then transmit in a DL slot including PDCCHs 214 and/or PDSCHs 216. The WTRU(s), on reception of the DL signals (e.g., PDCCHs 214 and/or PDSCHs 216), may perform LBT with fixed duration, LBT with random back off or no LBT, then transmit UL data 218. The channel reservation frame formats 202 may provide full RTS/CTS like protection at the cost of more DL/UL switches/overhead.

In another example, FEI=2 may indicate the frame exchanges according to channel reservation frame formats 203. After the transmission of CRreq signal 212, the gNB may continue transmitting PDCCHs 214 and PDSCHs 216. A WTRU (or WTRUs) may perform LBT with fixed duration, LBT with random back off or no LBT, then the WTRU may transmit CRresp signal 220 in the allocated resources followed by UL data 218. The channel reservation frame formats 203 may provide partial RTS/CTS like protection with limited DL/UL switches/overhead.

In another example, FEI=3 may indicate the frame exchanges according to channel reservation frame formats 204. After the transmission of CRreq signal 212, a WTRU (or WTRUs) may perform LBT with fixed duration, LBT with random back off or no LBT, then the WTRU may transmit CRresp signal 220 in the allocated resources. The WTRU(s) may continue transmitting uplink data 218 (e.g., physical uplink control channels (PUCCHs) and physical uplink shared channels (PUCCHs)) after the CRresp transmission 220. The UL transmission 218 may be transmitted without grant from the gNB. The gNB, on reception of the CRresp signal 220 and UL transmissions 218, may perform LBT with fixed duration, LBT with random back off or no LBT, then transmit in DL slot(s) including PDCCHs 214 and/or PDSCHs 216. The channel reservation frame formats 204 may be efficient for UL transmission especially with high latency requirements.

The above mentioned FEI values are example FEIs and the format of FEI may not be limited to these examples. In addition, one or more abovementioned formats may be utilized. The transmission of preamble 210, CRreq signal 212 and CRresp signal 220 may use the basic SCS 230 so that all the devices (e.g., gNB and/or one or more WTRUs) have a chance to detect these signals. The transmission of other control/data channels, such as downlink data (PDCCHs 214 and/or PDSCHs 216) and uplink data 218 (e.g., PUCCHs, PUCCHs), may use a selected SCS 232, which may or may not be the same as the basic SCS 230.

The CRresp signal 220 may carry one or more of the following information: BSS ID, WTRU ID, and/or channel/resource availability. The BSS ID field may be implicitly or explicitly carried to indicate the serving BSS. The WTRU ID field may be implicitly or explicitly carried to identify the WTRU. The channel/resource availability field may indicate channel/resource availability of the WTRU. In an example, the gNB may operate on aggregated channels (i.e., more than one 20 MHz channel). The WTRU may use the channel/resource availability field to indicate which channel(s) may be available for the WTRU to communicate with the gNB. The WTRU may use, for example, a bitmap to indicate the available channels/resources among all the channels/resources. In another example, the WTRU may use the channel/resource availability field to indicate which resource block or resource blocks may be available for the WTRU to use. In this example, the WTRU may be able to detect channel availability for each resource block.

The cell ID may be explicitly included in the CRreq signal 212 and/or CRresp signal 220 or implicitly included in the preamble 219, CRreq signal 212 and/or CRresp signal 220. Including the cell ID may enable the spatial reuse transmissions among cells. For example, a WTRU or a base station (e.g., gNB) may observe a preamble 210, CRreq signal 212 and/or a CRresp transmission 220 from a neighboring cell by checking the cell ID. Then the WTRU or the gNB may adjust an energy detection threshold to a predefined neighboring_cell_energy_detection_threshold. If the energy is greater than the threshold, the WTRU or gNB may defer its transmission. If the WTRU or the gNB determines according the cell ID that the transmission is from the same cell, the WTRU or the gNB may adjust energy detection threshold to a predefined desired_cell_energy_detection_threshold and compare the received energy with the threshold. If inter-cell spatial reuse is preferred, the system may set the two thresholds differently such that the device may have more chance to transmit if an inter-cell signal is observed.

The transmission of the CRreq signal 212 and CRresp signal 220 may not be carried by existing NR channels but a broadcast channel followed by the preamble 210. The detection of the CRreq signal 212 and the CRresp signal 220 may be triggered by the detection of preamble 210. In an example, the CRreq signal 212 and the CRresp signal 220 may not always be transmitted after the preamble signal 210. In another example, one predefined/predetermined preamble sequence may be used in preamble 210 to indicate the presence of the CRreq signal 212 and/or the CRresp signal 220.

In another example, the CRreq signal 212 and/or the CRresp signal 220 may be carried using PUCCH (e.g., in uplink data 218. In this case, the CRreq signal 212 and/or the CRresp signal 220 may be scrambled by a specially defined RNTI. For example, the RNTI may be a general broadcast RNTI which may be used by all the devices to detect the CRreq signal 212 and/or the CRresp signal 220.

Figure 3:
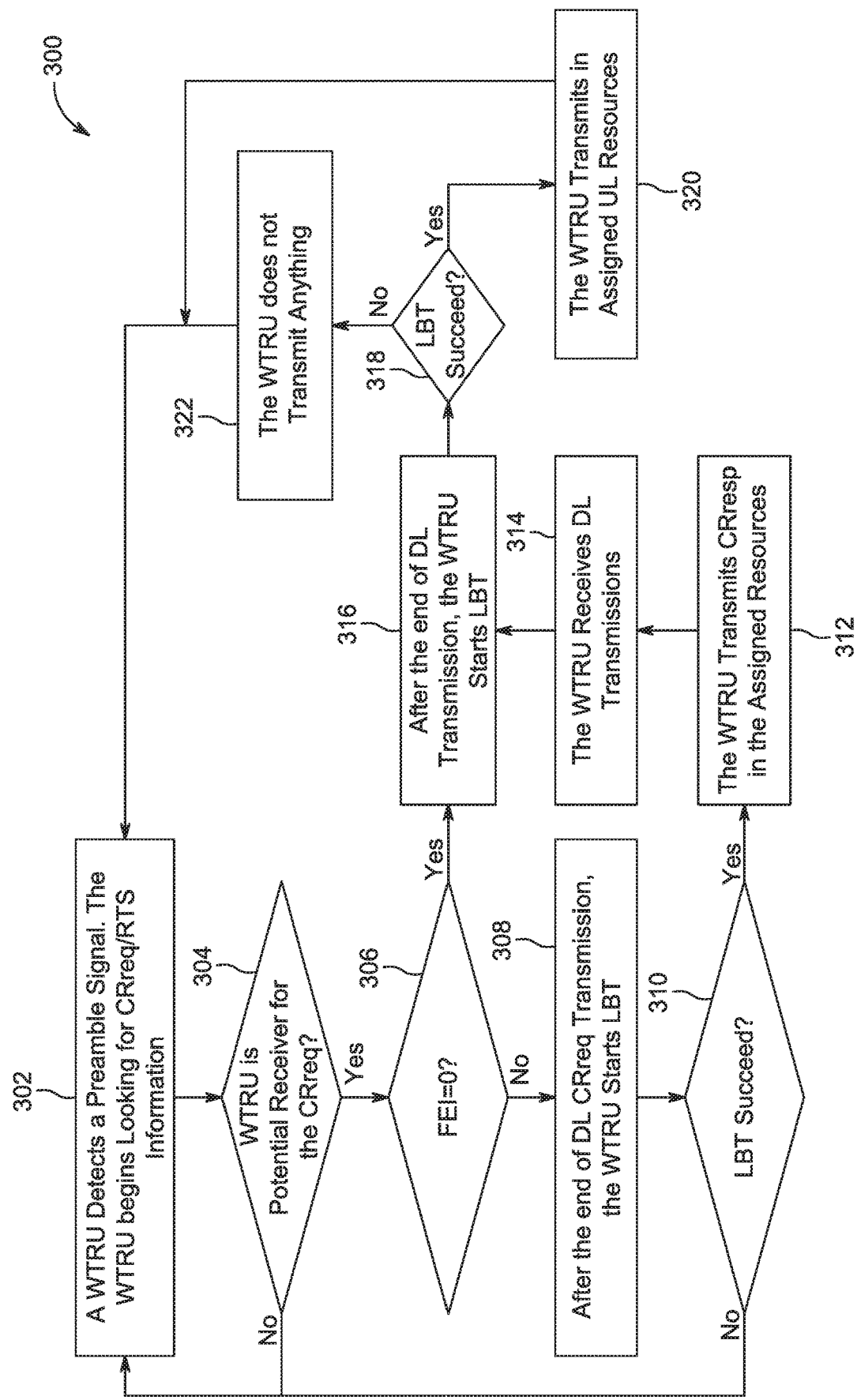
FIG. 3 shows a flow diagram of an example channel reservation procedure, where channel reservation frame formats according fast exchange indication (FEI) equal to 0 and 1 may be present.

FIG. 3 shows a flow diagram of an example channel reservation procedure 300, where channel reservation frame formats according FEI=0 and FEI=1 may be present. The example channel reservation procedure 300 may be performed by a WTRU. At 302, a WTRU may detect a preamble signal (e.g., by monitoring the channel and receiving a preamble signal broadcast on the channel). Based on the preamble signal, the WTRU may listen to the channel for a CRreq signal (e.g., RTS) and may locate and decode the CRreq signal. At step 304, the WTRU determines if the WTRU is a potential receiver for the CRreq. If the WTRU is not be a potential receiver of the CRreq, the WTRU may continue monitoring the channel (return to 302). In an example, the WTRU may observe the transmission duration of the upcoming COT, and may enter a power saving mode until the end of the COT prior to continuing to monitor the channel. If the WTRU may be a potential receiver of the CRreq frame, at 306 the WTRU may check the FEI value. If FEI=0, the WTRU may expect/receive PDCCHs and PDSCHs transmitted from the gNB. For FEI=0, at 316, after the DL transmission, the WTRU may perform LBT and prepare its uplink transmission. If FEI=1 (i.e., FEI is not equal to 0), at 308 the WTRU may perform LBT after the end of the CRreq transmission. At 310, the WTRU may determine if the LBT was successful. If LBT failed, the WTRU may continue monitoring the channel (return to 302). If LBT succeeded, then at 312 the WTRU may transmit a CRresp signal in the assigned resources. At 314, the WTRU may receive DL PDCCH and PDSCH transmissions from the gNB. At 316, after the end of DL transmissions (PDCCH and PDSCH), the WTRU may perform LBT and prepare its uplink transmission.

In either case where FEI=0 or FEI=1, after the end of the DL transmission and LBT at 316, at 318, the WTRU may determine if the LBT was successful. If the LBT succeeded, at 320 the WTRU may transmit in uplink in assigned UL resources then continue monitoring the channel (return to 302). If the LBT failed, at 322 the WTRU may not transmit anything in the uplink and may continue monitoring the channel (return to 302).

Timing advance (TA) may be used for CTS like transmissions in the UL. Due to the information that is carried and used for coexistence of systems and networks, channel reservation messages such as RTS, CTS, or COT-physical broadcast channel (COT-PBCH) may be detected and processed by competing NRU devices in addition to the intended WTRU or gNB. In an example, a first gNB and a first WTRU exchange one or more channel reservation messages, which helps the gNB in efficient COT scheduling and helps WTRU in efficient reception. The channel reservation messages may be further used by neighboring NRU devices that operate in the same unlicensed channel to infer some of the channel reservation information. For example a second competing gNB and a second WTRU may decode the COT duration from a channel reservation message between the first gNB and the first WTRU. The second gNB and second WTRU may defer transmission in the unlicensed channel for the COT duration and thus enhance the quality of the data exchange between the first gNB and the first WTRU and provide a better power saving experience for at least the second WTRU. Since this behavior is reciprocal, in a later stage when second gNB or the second WTRU starts a COT, the first gNB and first WTRU may similarly defer transmission for the corresponding COT duration.

Figure 4:
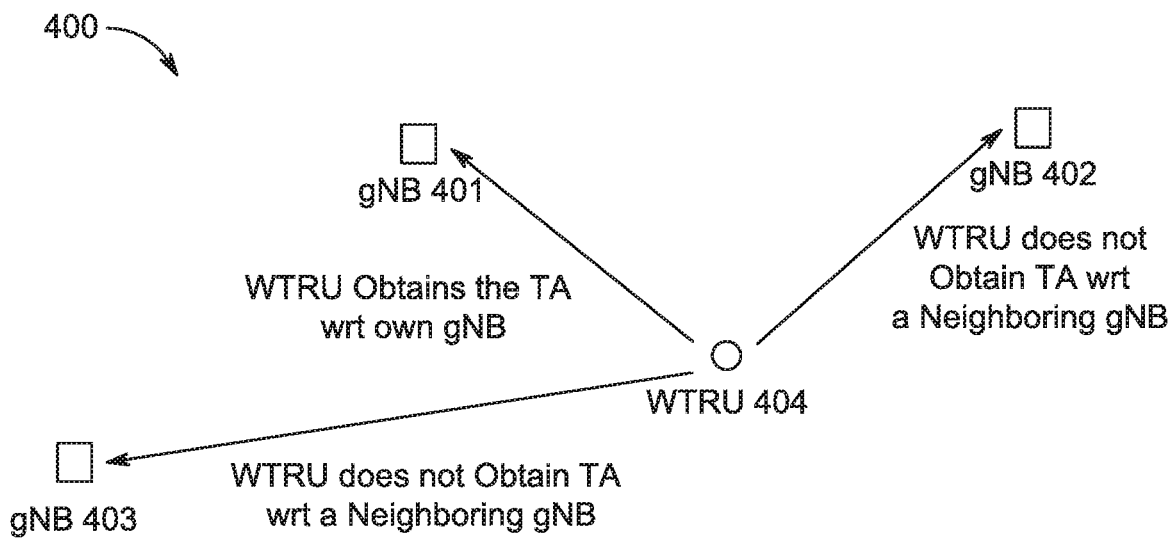
FIG. 4 shows an example network where the WTRU obtains a timing advance (TA) with respect to its own gNB but does not obtain TAs for neighboring gNBs.

A difficulty in reception and decoding of CTS, or any channel reservation message sent by a WTRU, may be the timing-advance (TA) where a WTRU may transmit an UL signal to a gNB at the intended timing that is also a short amount of time before the CTS. In this case, the need for TA is motivated by the varying distance of a WTRU to the gNB, and given that an NR cell may be large, other WTRUs further from the gNB may need to transmit their UL data earlier. Thus, a TA may be defined for a WTRU relative to its corresponding gNB (and there is no TA defined for the WTRU relative to other gNBs such as neighboring gNBs). FIG. 4 shows an example network 400 where the WTRU 404 obtains a TA with respect to its own gNB 401, but does not obtain TAs for neighboring gNBs 403 and 404. However, if a CTS sent by the WTRU is expected to be received by another gNB (e.g., a neighboring gNB), then a different TA may need be used.

In an example, a WTRU may send multiple CTSs (e.g., sequentially) each with a different TAs. For example, the WTRU may send a first CTS with a default TA to its corresponding gNB, a second CTS with a second TA to a first neighboring gNB, and a third CTS with a third TA to a second neighboring gNB. Depending on the TA values, a gap (e.g., of one or more symbols) may be used between two consecutive CTSs.

A WTRU may perform any one or more of the following actions to obtain additional TAs for neighboring gNBs. In an example, the WTRU may estimate the additional TA values by observing/detecting the synchronization signal blocks (SSBs), synchronization signals (PSSs) and/or synchronization signals (SSSs) of the neighboring gNBs. This task may be performed by the WTRU infrequently and outside of a COT of its corresponding gNB (the PSS/SS from the corresponding gNB carry the intended cell ID).

Figure 5:
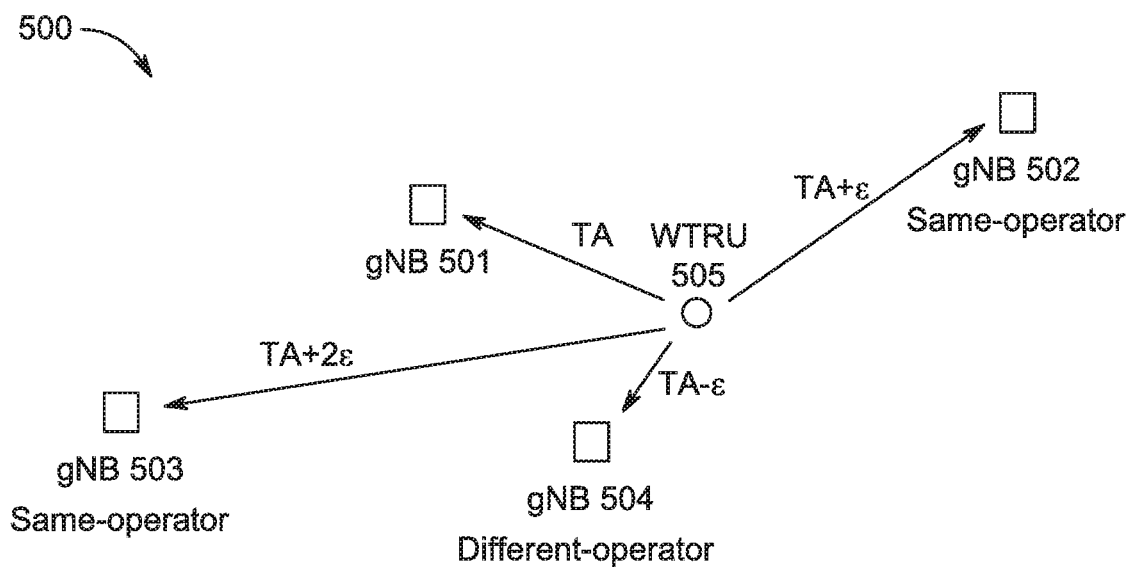
FIG. 5 shows an example network where the WTRU is connected to the nearest gNB of the desired operator and obtains TAs from multiple gNBs.

In another example, the WTRU may perform incremental changes with respect to the default TA associated with the gNB connected to the WTRU. FIG. 5 shows an example network 500 where the WTRU 505 is connected to the nearest gNB 501 of the desired operator. In this example, other same-operator gNBs 502 and/or 503 may be farther from WTRU 505 than the default gNB 501. However, if the NRU deployment is small-cell, then the TA of the other same-operator gNBs 502 and/or 503 may be incrementally larger than the default TA of gNB 501. In this case, incremental TAs may be associated with the other gNBs (c may be a minimum step in increasing TA such as 0.5208 μs): TA+ε may be associated with closer same-operator gNB 502; and TA+2ε may be associated with further same-operator gNB 503.

While the WTRU 505 is connected to the nearest same-operator gNB 501, there may be a different-operator gNB 504 that is closer to the WTRU 505. In this case, the WTRU 505 may send a CTS with a TA to gNB 504 that is incrementally less than the default TA (i.e. TA−ε) so that closer different-operator gNBs may detect the CTS (or any other coexistence message transmitted by the WTRU 505).

In an example, a WTRU may first evaluate its default TA and if the default TA is the minimum (e.g. TA=0), then the WTRU may send one or more additional CTSs with incrementally larger TA (e.g., TA−ε, TA+2ε . . . ). If the default TA is not the minimum TA, then the WTRU may send one or more additional CTSs with incrementally smaller and larger TAs (e.g., TA±ε, TA±2ε . . . ).

Receiver assisted LBT may be used for NR-U with carrier aggregation. In NR-U systems with channel aggregation, a WTRU may be able to operate on a primary cell (Pcell) in a licensed band and on a secondary cell (Scell) in an unlicensed band. The WTRU may be able to transmit and receive concurrently over the Pcell and Scell.

Slot based LBT may be used for the procedures described herein. For example, slot based LBT may be used to enable multiple WTRUs to transmit concurrently in UL with LBT. In the case of slot based LBT, the ending time of a LBT period may be fixed at a slot boundary. For example, a WTRU may perform LBT and the ending point of the LBT may be at the beginning of slot N+k. $T_{\{N+k\}}$ may be used to denote the time at the beginning of slot N+k. The starting time of the LBT may be $T_{\{N+k\}}-T_{slot} \times N_{backoff}$. $N_{backoff}$ may be the backoff duration for the WTRU and $T_{slot}$ may be the time duration for each backoff slot. In an example, $N_{backoff}$ may initially be selected randomly between 0 and CW_p, where CW_p is the contention window. In an example, $CW_{minp} \leq CW_p \leq CW_{maxp}$ where $CW_{minp}$ and $CW_{maxp}$ may be predefined or predetermined or signalled. The WTRU may sense the channel as part of LBT starting from the time $T_{\{N+k\}}-T_{slot} \times N_{backoff}$. In an example, if the WTRU senses the channel may be free for a backoff slot duration, the WTRU may set $N_{backoff}=N_{backoff}$. If $N_{backoff}$ reaches 0 (i.e. at time point $T_{N+k}$), the WTRU senses the channel is free and may complete the LBT and transmit CTS over the Pcell back to the gNB. If the WTRU senses the channel is busy during the LBT, the WTRU may hold for a period of $N_{backoff}$, and may use the channel in a later random access backoff procedure. The later random access backoff procedure may be a random backoff defined in LAA or a slot based random backoff as described herein. In this case, the WTRU may not transmit CTS over the Pcell or the WTRU may transmit a CTS in the Pcell and may include a field in the CTS to indicate the LBT failure.

Figure 6:
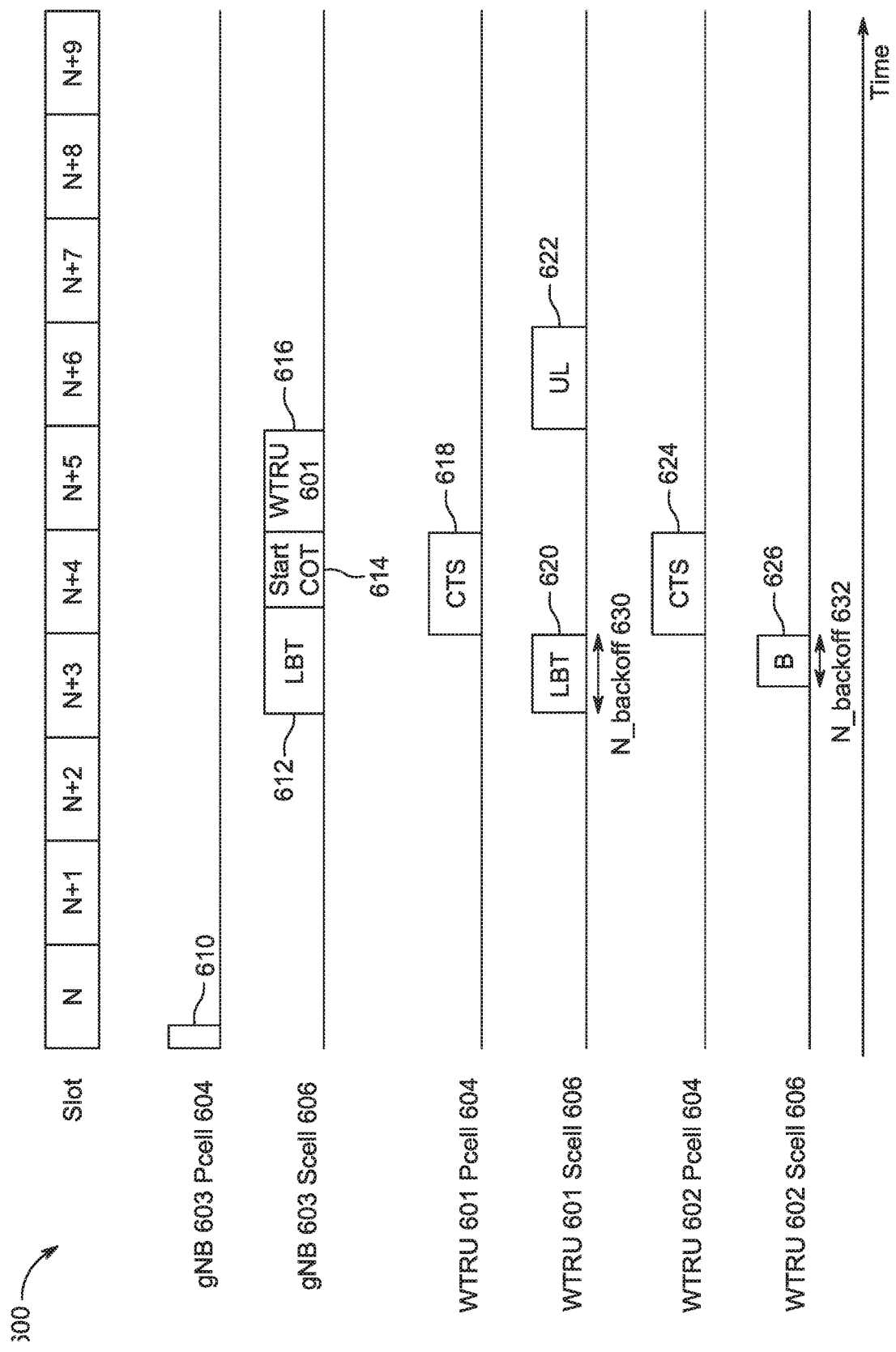
FIG. 6 shows a signaling diagram of an example receiver assisted channel access procedure used in channel aggregation NR-U.

FIG. 6 shows a signaling diagram of an example receiver assisted channel access procedure 600 used in channel aggregation NR-U. The example receiver assisted channel access procedure 600 may enable concurrent clear channel transmission in the channel aggregation case. The gNB 603 may communicate with WTRU 601 and/or WTRU 602 on at least Pcell 604 and Scell 606, where Pcell 604 may be in licensed spectrum and Scell 606 may be in unlicensed spectrum. In an example, the gNB 603 may begin transmission in Scell 606.

At slot N, the gNB 603 may transmit one or more DCIs 610 on one or more channel(s) in Pcell 604. The DCI 610 may carry one or more fields with information including, but not limited to, information regarding any of the following: scheduling for transmission on channel(s) in Scell 606, receiver assisted channel access in the Scell 606, and/or frequency/time allocation for CTS transmission on channel(s) in the Pcell 604. The scheduling for transmission on channel(s) in Scell 606 may indicate, for example, the (e.g., slotted) start time and/or end time of the scheduling period for the gNB 603 on the Scell 606. The receiver assisted field (e.g., 1 bit) may indicate if receiver assisted channel access in the Scell 606 should or should not be used. When receiver assisted field indicates that receiver assisted channel access should be used in the Scell 606, then the intended WTRUs 601 and/or 602 may perform slot based LBT 620 (for N-backoff 630 backoff slots) and 626 (for N-backoff 632 backoff slots), respectively, before sending their respective CTSs 618 and 624. The frequency/time allocation field for the CTS transmission on channel(s) in Pcell may be used when receiver assisted field is set. The frequency/time allocation field may indicate the frequency/time resources allocated to the WTRU for CTS transmission on channel(s) in Pcell 604.

A transmission in Scell 606 may be scheduled in slot N+k (e.g., slot N+4). In an example, the transmission in Scell 606 may be scheduled in slot N+k to slot N+k+k1 (e.g., slot N+4 to slot N+5). The gNB 603 may try to transmit on Scell 606 in slot N+k (e.g., N+4) by performing an LBT 612 on Scell 606. If the gNB 603 succeeds with a successful LBT 612, it may not use the rest of the scheduled slots. In the case that the LBT 612 is unsuccessful, the gNB 603 may continue to perform LBT in the subsequent scheduled slots until the gNB 603 has a successful LBT or has reached the end of the scheduled period N+k+k1+1 (e.g., end of slot N+6).

The gNB 603 may perform LBT 612 in a slot before scheduled slot N+k. For example, the gNB 603 may start LBT 612 in slot N+K−1 (e.g., slot N+3) when the channel on the Scell 606 may be free. The gNB 603 may start a COT by transmitting signalling 614 on a channel in Scell 606 immediately once the LBT 612 is successful. For example, as part of DL signalling 614, the gNB 603 may transmit a preamble, COT format information (e.g., COT-PBCH), broadcast information and/or reference signalling to the WTRUs 601 and 602. The DL signalling 614 may indicate COT configuration information, scheduling information and/or group information, for example. During this period, the gNB may monitor the Pcell 604 for CTS messages from the WTRUs 601 and 602. Once the gNB 603 detects one or more CTS messages, such as CTS 618 from WTRU 601 and/or CTS 624 from WTRU 602, in the Pcell 604, the gNB 603 may begin scheduling UL and/or DL transmissions in Scell 606 based on the reception of CTSs 618 and/or 624 in Pcell 604. For example, the gNB 603 may receive CTSs 618 and 624 (or positive CTSs) from WTRU 601 and WTRU 602, respectively, in the Pcell 604. Then the gNB 603 may schedule in COT signalling 614 DL/UL transmissions to/from WTRU 601 and WTRU 602. For example, based on CTSs 618 and 624, the gNB 603 may send scheduling information in signalling 616 to WTRU 601 to schedule WTRU 601 for UL transmission (e.g., UL signal 622). The gNB may receive negative CTS 624 (or no CTS) from WTRU 602, and the gNB 603 may accordingly not schedule any UL transmissions to WTRU 602. In an example, the gNB 603 may fail the LBT 612 for slot N+k (N+4), and the gNB 603 may hold transmissions and repeat the LBT for slot N+k+1 if N+k+1<=N+k+k1.

The WTRU 601, which may be an intended receiver of the receiver assisted channel access procedure 600, may perform slot based LBT 620 in Scell 606 before slot N+k (e.g., in slot N+3 or N+k−1). If the slot based LBT 620 is successful in Scell 606 (i.e., the WTRU 601 does not sense signals in the channel on Scell 606 with energy level higher than a predefined threshold), the WTRU 601 may transmit CTS 618 (or positive CTS) in Pcell 604 on the allocated resource, and may transmit UL signals 622 on a channel in the Scell 606 (e.g., in slot N+6). In an example not shown, if the slot based LBT 620 is unsuccessful in Scell 606 (i.e., the WTRU 601 senses signals in the channel on Scell 606 with energy level higher than the predefined threshold), the WTRU 601 may not transmit anything or may transmit a negative CTS (not shown) in Pcell 604 in the allocated resources.

In the case that the WTRU 601 successfully performs LBT 620 in Scell 606, the WTRU 601 may prepare for the reception in Scell 606. The WTRU 601 may detect the COT transmissions 614 (in slots N+4 and/or N+5) from gNB 603 such as the preamble, COT format information, scheduling in PDCCH and/or data transmission 616 in a physical downlink shared channel (PDSCH). In an example, the WTRU 601 may prepare UL transmission 622 if the WTRU 601 receives scheduling information from the gNB 603. In another example, the WTRU 601 may start UL transmission 622 without grant from the gNB 603 by using predefined/allocated resources.

Figure 7:
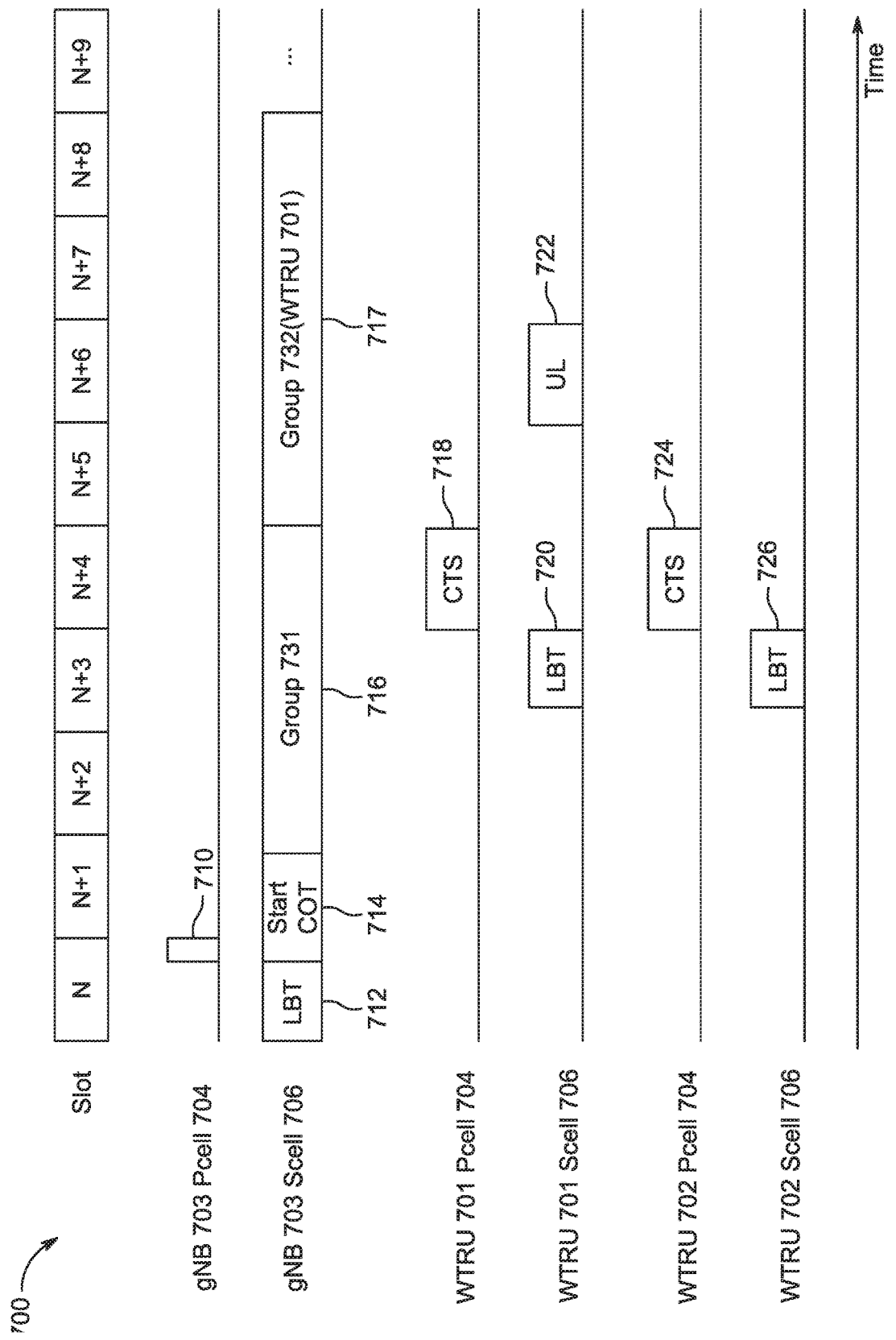
FIG. 7 shows a signaling diagram of an example group-based receiver assisted channel access procedure used in channel aggregation NR-U.

Group-based receiver assisted channel access may be used for NR-U with carrier aggregation (CA). FIG. 7 shows a signaling diagram of an example group-based receiver assisted channel access procedure 700 used in channel aggregation NR-U. In the example of FIG. 7, the gNB 703 may transmit scheduling and/or group information and/or COT configuration information 710 before or at the beginning of the COT 714 in a Scell 706 (e.g., in one or more messages). In another example, the scheduling and/or group information and/or COT configuration information 710 may be transmitted over Pcell 704 and may be transmitted as DCIs carried by PDCCH. The scheduling information 710 may contain control information regarding group based COT transmission in Scell 706. For example, the scheduling information 710 may include, but is not limited to include, any of the following information: group identities (IDs), time slot setting, receiver assisted information for Scell 706, and/or frequency/time allocation for the CTS transmission in Pcell 704. One or more of the group IDs to indicate the scheduled COT transmission(s) may be shared by the groups. The time slot set setting field may indicate the number of time slot set and the number of time slots in a time slot set. The receiver assisted field (e.g., 1 bit) may indicate may indicate if receiver assisted channel access in the Scell 706 should or should not be used. When the receiver assisted field is set, the WTRUs 701 and/or 702 in a corresponding group m may perform LBT in Scell 706 before the V time slot set. The frequency/time allocation field for the CTS transmission in Pcell may be used when receiver assisted field is set. The frequency/time allocation field may indicate the frequency/time resources allocated to the WTRU for CTS transmission in Pcell 704. In an example, the allocation or scheduling may be periodic in the beginning of every time slot set associated with a group.

In an example, a group 731 COT transmission may be shared with group 731 in the first time slot set 716 (e.g., slot N+2 to N+4), and a group 732 COT transmission may be shared with group 732 in a second time slot set 717 (e.g., slot N+5 to N+8). In this example, WTRUs 701 and 702 are part of group 732. A time slot set may be composed with one or more DL/UL slots with zero, one or more DL/UL switches. The group IDs may be transmitted in order such that the mapping between a group to a time slot set may be implicitly signaled by the order. In an example, WTRUs 701 and/or 702 may transmit positive/negative CTSs 718 and 724, respectively, in Pcell 704 in the allocated resources if the respective LBTs 720 and 726 succeed/fail, respectively. In another example, WTRUs 701 and/or 702 may transmit CTSs 718 and 724, respectively, in Pcell 704 in the allocated resources only if the respective LBTs 720 and 726 succeed. In this case, WTRUs 701 and/or 702 may exchange data with the gNB 703 in time slot set 717.

In an example not shown, the gNB 703 may perform LBT before each time slot set. In an example, the gNB 703 may perform one LBT 712 to acquire the channel on the Scell 706 and begin group based COT transmission on the channel in the Scell 706. In an example, the gNB 703 may acquire the channel in the Scell 706 based on LBT 712. Meanwhile, the gNB 703 may transmit the scheduling information 710 (e.g., DCI) about the COT at the earliest available time slot (e.g., N or N+1) in Pcell 704. In an method, the scheduling information may include grouping information and/or a mapping between groups 731 and 732 and time slot sets 716 and 717. For example, in the case that WTRUs 701 and 702 belong to group 732, the mapping would indicate the corresponding time slot set 717. In an example, the grouping information and/or COT configuration information may be configured (e.g., provided to the WTRUs 710, 702) by the gNB 703 before the start of the COT 714. In an example, groups may be identified by group IDs. The gNB 703 may assign a group ID to a WTRU 701/702 in the scheduling information 710 and/or before the COT. The gNB 703 may include the group ID at the beginning of each slot set 716, 717 so that the WTRUs 701 and 702 may know which slot sets to use.

The WTRUs 701 and 702 that receive scheduling information 710 on the channel in the cell 704 may check the indicated group IDs. If the WTRU 701 and/or 702 belongs to a detected group (e.g., group ID 731 or 732), the WTRU 701 and/or 702 may check the time slot set setting to locate a time slot set allocated for the group. The WTRUs 701 and 702 may perform slot based LBT 720 and 726, respectively, before the time slot set boundary in Scell 706. The WTRUs 701 and 702 may transmit CTSs 718 and 724, respectively (or no CTS) in the Pcell 704 depending on the results (successful or unsuccessful) of the respective LBTs 720 and 726. The WTRUs 701 and 702 that perform LBT 720 and 726 successfully in Scell 706 may be able to communicate with the gNB 703 in the corresponding time slot set in Scell 706. For example, WTRU 701 may send UL message(s) 722 on Scell 705 during the time slot set N+5 to N+8 associated with group 732, after a successful LBT 720 and transmission of CTS 718 on Pcell 704.

Figure 8:
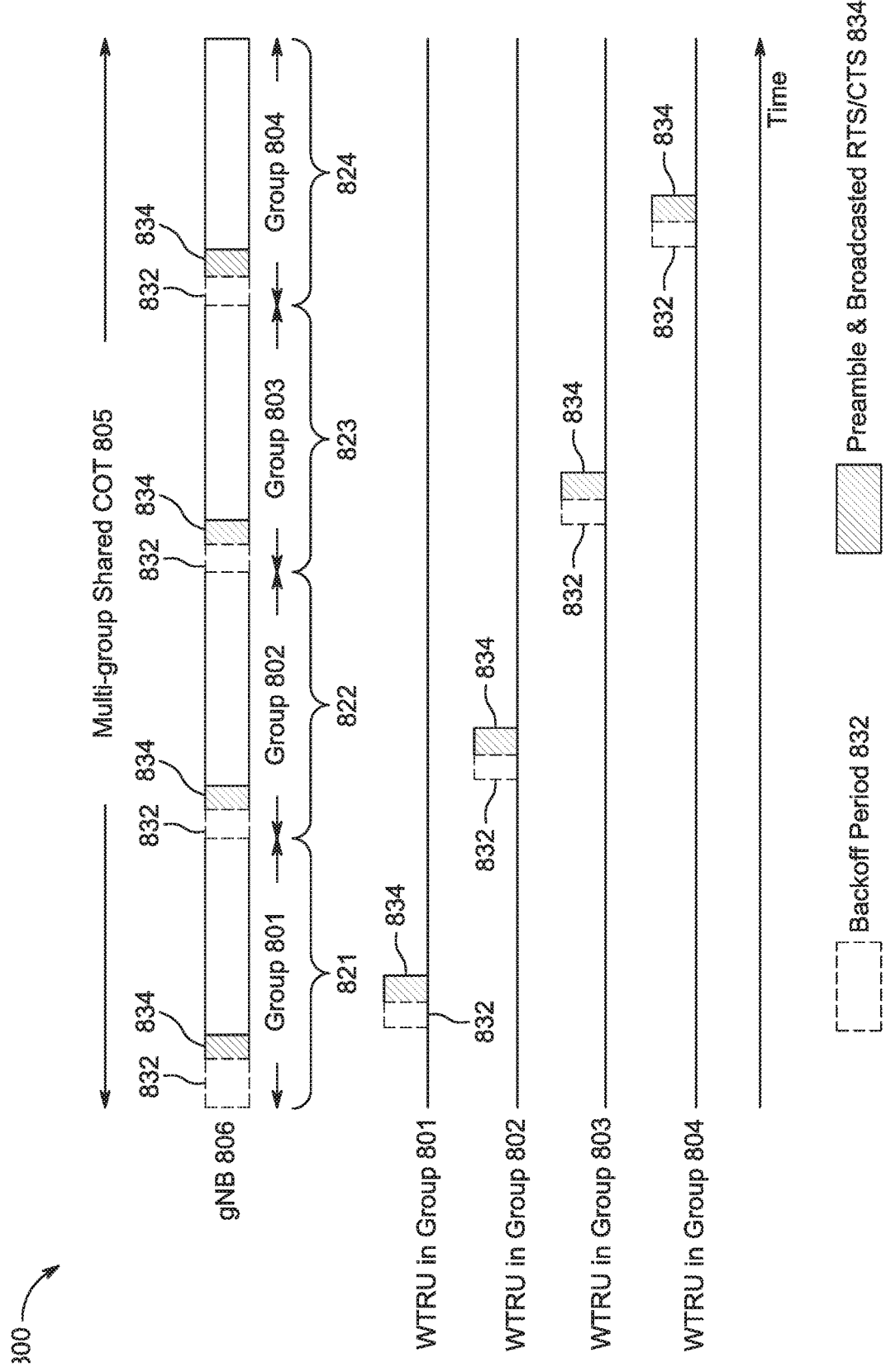
FIG. 8 shows a signaling diagram of an example group-based receiver assisted channel access procedure for use in NR-U with channel aggregation.

Group-based shared COT may be used as part of receiver assisted LBT in a shared COT in NR-U. FIG. 8 shows a signaling diagram of an example group-based receiver assisted channel access procedure 800 for use in NR-U with channel aggregation. As shown in FIG. 8, several group based COT transmission and channel access schemes may be implemented. gNB 806 may acquire the channel and start a multi-group shared COT 805. The COT 805 may be shared with one or more groups of WTRUs (e.g., WTRU groups 801, 802, 803 and 804). The WTRU grouping may be performed separately before the start of the shared COT 805. If the gNB 806 intends to communicate with K groups of WTRUs (e.g., K=4 groups), the gNB 806 may partition the COT 805 into K non-overlapping time slot sets 821, 822, 823, and 824 corresponding to each of the WTRU groups 801, 802, 803 and 804. For example, the gNB 806 may communicate with WTRUs in group 801 in time slot set 821, with WTRUs in group 802 in time slot set 822, with WTRUs in group 803 in time slot set 823 and with WTRUs in group 804 in time slot set 824, where the communications may be UL and/or DL communications and may include backoff/LBT periods 832 and/or preamble transmission and broadcasted RTS/CTS 834 (the preamble, RTS and CTS may be separate messages). In an example now shown, the gNB 806 may partition the COT 805 into K+M non-overlapping time slot sets (i.e., into more time lot sets than number of WTRU groups). The gNB 806 may use K time slot sets to communicate with the intended K group of WTRUs, and use the remaining M time slot sets for other purposes. For example, the gNB 806 may use the remaining M time slot sets for transmissions without grant for any WTRU to access. In an example not shown, the gNB 806 may transmit group information and time slot set information only at the beginning of the COT 805. In the example shown in FIG. 8, the gNB 806 may transmit a preamble and RTS signal 834 (which may be separate messages) at the beginning of each time slot set 821, 822, 823 and 824. The group related information and resource allocation may be carried in the preamble(s) and RTS(s) 834 transmitted by the gNB 806. The gNB 806 may or may not perform LBT 832 before (or at the beginning of) each time slot set 821, 822, 823, 824.

Receiver assisted channel access may be performed at the beginning or before the boundary of the slot sets. For example, a WTRU may receive COT duration, group information, time slot set partition information and/or CTS resource allocation from the gNB at the beginning of the COT. In another example, the above-mentioned information may be transmitted before the COT in the serving channel or any other aggregated channel(s).

The WTRU may check the received group information to determine if the WTRU is a part of a group. If the WTRU is not part of a group, the WTRU may determine that it may not transmit/receive within the COT duration. In this case, the WTRU may switch to power saving mode for the COT duration. In an example, if the WTRU has uplink traffic to transmit and is not part of a group, the WTRU may monitor the configuration of COT to locate resources allocated for transmission without grant. The WTRU may transmit in the slot allocated for transmission without grant and may then switch to power saving mode. To save more power, the gNB may allocate resources for transmission without grant at the beginning of the COT. If the WTRU is part of a group, the WTRU may check the group information and locate the corresponding time slot set allocated to the group. In an example, the WTRU may check preamble and RTS transmission from the gNB right before the time slot set and acquire the group related information. The WTRU may perform LBT on the channel after the reception of the preamble and RTS from the gNB. The WTRU may transmit CTS on the channel if the LBT is successfully performed. If the WTRU fails the LBT, it may not transmit CTS to the gNB. The LBT may be LBT with fixed duration or LBT with fixed duration plus random backoff. If the CTS transmitted by the WTRU is successfully decoded by the gNB, the WTRU may communicate with the gNB in the time slot set. If the CTS is not successfully decoded by the gNB, the WTRU may not be able to use the time slot set.

In another example, a nested group access mechanism may be used. In this case, the WTRU groups may be nested such that $Group_1 \subseteq Group_2 \subseteq \ldots \subseteq Group_K$, implying that a WTRU belonging to $Group_k$, also belongs to all the nested groups to $Group_1$ through to $Group_{k-1}$. A WTRU that belongs to one or more groups may try to access the channel using the earliest possible time slot set associated with one of its groups. The WTRU may determine if it is a member of the the group associated with a time slot set (e.g., my receiving group information for the time slot set in a preamble message, an RTS message or any other message from the gNB, and comparing that information with the knowledge of its own group memberships). If the WTRU is a member of the group associated with the time slot set, the WTRU may attempt to access the channel by before LBT on the channel, monitoring and receiving an RTS from the gNB and/or sending a CTS back to the gNB. If the WTRU fails the LBT or the gNB fails to receive the CTS transmission from the WTRU or the WTRU fails to communicate with the gNB during the time slot set for any other reason (e.g., the gNB denies the WTRU access in the RTS or some other message), the WTRU may try to access the channel using the same approach in a subsequent possible time slot set associated with another one of its groups. If the WTRU successfully communicates with the gNB using the time slot set k, the WTRU may or may not try to access the channel again in a later time slot set (e.g., the WTRU may enter a power save mode for the remainder of the COT).

The gNB may group the WTRUs based on other criteria such as priority and/or latency requirements. For example, WTRUs having higher priority and/or low latency requirements may be put into a smaller group and may belong to multiple nested groups and thus have a better chance to access the channel during the group shared COT. In an example, the preamble may be grouped based sequences. A set of preamble sequences may be predefined/predetermined. Each preamble sequence may be assigned to a group of WTRUs before the COT. A WTRU may detect the preamble using its assigned sequence. If a WTRU detects its own preamble, the WTRU may determine that the subsequent time slot set may be used for the WTRU's group. In this way, the group information may be implicitly signaled by the preamble. The above example procedures may be applied to multiple COT transmission scenarios as well. For example, each time slot set or group time slot set may correspond to a different COT.

Figure 9:
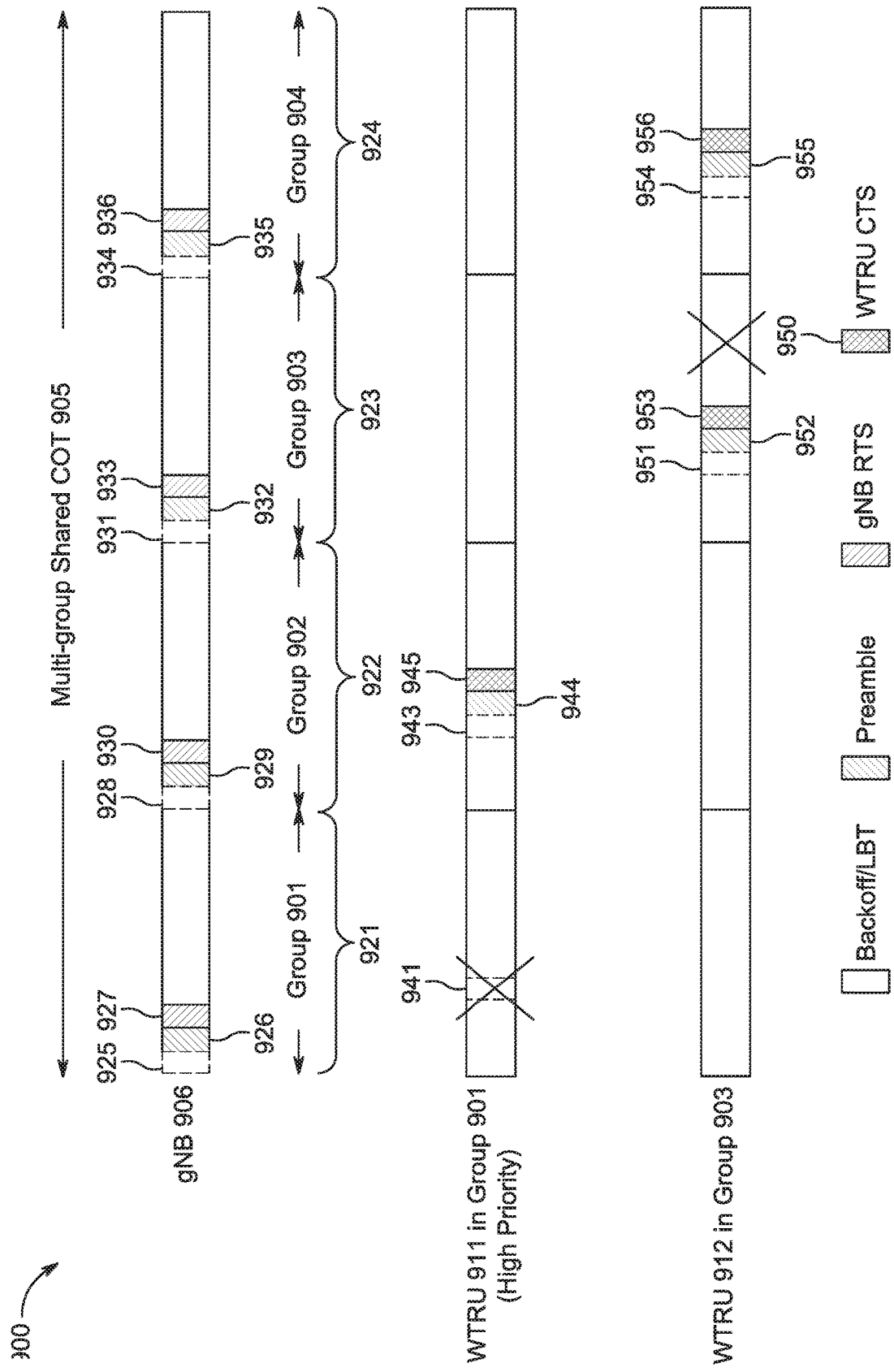
FIG. 9 shows a signaling diagram of an example group-based receiver assisted channel access procedure for use in NR-U with channel aggregation where the groups are nested.

FIG. 9 shows a signaling diagram of an example group-based receiver assisted channel access procedure 900 for use in NR-U with channel aggregation where the groups are nested. the gNB 906 may partition the COT 905 into K=4 non-overlapping time slot sets 921, 922, 923, and 924 for communication with WTRUs in each of the groups 901, 902, 903 and 904, respectively. The group membership is nested $Group_{901} \subseteq Group_{902} \subseteq Group_{903} \subseteq Group_{904}$. In the example of FIG. 9, WTRU 911 belongs to group 901 and thus also (at least initially) belongs to groups 902, 903 and 904. WTRU 911 may be a high priority WTRU, and thus may be given more access to the channel by being a member of all the groups. WTRU 912 belongs to group 903 and thus also (at least initially) belongs to group 904. The gNB 906 may transmit preamble(s) 926, 929, 932, 935 and RTS signal(s) 927, 930, 933, 936, at the beginning of each respective time slot set 921, 922, 923 and 924, as shown in FIG. 9. The group related information and/or resource allocation may be provided to the WTRUs 911, 912 by the gNB 906 in the preamble(s) 926, 929, 932, 935 and/or RTS signal(s) 927, 930, 933, 936 transmitted by the gNB 906. In another example, the group related information may be configured by the gNB 906 before the COT 905, for example in other control or data signaling (not shown). In another example, the grouping may be implicit and determined the WTRUs 911, 912, for example based on the WTRU's priority. The gNB 906 may or may not perform LBT 925, 928, 931, 934 before (or at the beginning of) each respective time slot set 921, 922, 923 and 924. In an example, the RTS signal(s) 927, 930, 933, 936 may be carried on PDCCH(s).

In time slot set 921, the WTRU 911 may determine (by receiving preamble 926 and/or RTS 927) that the time slot set 921 is for group 901, which WTRU 911 may access. The WTRU 911 may attempt to access the channel by performing LBT 941. If the LBT 941 fails, the WTRU 911 may try again to access the channel in time slot set 922 for group 902 by performing another LBT 943. If the LBT 943 is successful, the WTRU 911 may send preamble 944 and/or CTS 945 to the gNB 906 and may then access the channel in time slot set 922, for example to send UL data (not shown) and/or to monitor and receive DL data (not shown). Once WTRU 911 transmits UL data successfully (e.g., in time slot set 922), WTRU 911 may be removed from group 902 (e.g., by the gNB 906), and thus may not attempt to access time slot sets 923 and 924 associated with nested groups 903 and 904 and/or may enter a power saving mode (power save mode, sleep mode) during time slot sets 923 and 924. In other words, the group membership of the WTRUs 911, 912 may change dynamically over the COT 905.

In time slot sets 921 and 922, the WTRU 912 may determine (e.g., by receiving, respectively, preamble 926 and/or RTS 927 and preamble 929 and/or RTS 930) that the time slot sets 921 and 922 are for groups 901 and 902, which WTRU 912 is not a member. Thus, the WTRU 912 may enter a power saving mode during time slot sets 921 and 922. The WTRU 912 may determine (e.g., by receiving, respectively, preamble 932 and/or RTS 933 and preamble 935 and/or RTS 936) that the time slot sets 923 and 924 are for groups 903 and 904, which WTRU 912 may access. The WTRU 912 may attempt to access the channel in time slot set 923 by performing LBT 951. The LBT 951 may be successful and the WTRU 912 may send preamble 952 and CTS 953; however there may be no resources allocated to group 903 (which may be determined based on the RTS 952 transmitted by gNB 906). In this case, the WTRU 912 may try again to access the channel in time slot set 924 for group 904 but performing another LBT 954. If the LBT 954 is successful, the WTRU 912 may send preamble 955 and CTS 956 to the gNB 906 and may then access the channel in time slot set 924, for example to send UL data (not shown) and/or to monitor and receive DL data (not shown). In an example, the CTS signal(s) 945, 953, 956 may be carried on PUCCH(s).

In another example, channel access procedures for group-based shared COT may use antenna sections and/or directions. In this case, the grouping mechanism may be bases on spatial domain characters. For example, the gNB may form N beams towards N directions/sectors. In a group based shared COT, the gNB may determine to communicate with WTRUs in K directions/sectors out of the N directions/sectors. Then the gNB may partition the COT to K time slot sets, where each may correspond to one sector. Or the gNB partition the COT to more than K time slot sets, where K of them may be corresponding to sector/directional transmissions, where the rest may be corresponding to Omni transmissions or transmissions to more than one sectors.

FIG. 10 shows a signaling diagram of an example group-based receiver assisted channel access procedure 1000 of a group-based shared COT 1005 with antenna directions/sectors. In the example of FIG. 10, the gNB 1006 may acquire the channel (e.g., using a LBT 1031) and transmit preamble and RTS 1032 (which may be separate messages) at the beginning of COT 1005. The preamble and RTS 1032 may be transmitted using sector and/or beam 1051. WTRUs located in sector 1051 (e.g., WTRU(s) in group 1001) may respond to RTS 1032 with CTS 1042 (following a LBT 1041). The CTS 1042 may be transmitted using a directional or omni-directional antenna pattern by the WTRU. The gNB 1006 may use a directional antenna pattern corresponding to the transmit antenna pattern of the preamble and RTS 1032 to detect the CTS transmission 1042. Then the gNB 1006 may schedule DL/UL transmissions between the gNB and WTRUs in the sector (e.g., in group 1001). The gNB 1006 and respective WTRUs may behave similarly in non-overlapping time slot sets 1022, 1023, and 1024 using respective sectors/beams 1052, 1053 and 1054 by exchanging RTS/CTS (1034/1044, 1036/1046, 1038/1048) and performing LBT (1033, 1043, 1035, 1045, 1037, 1047).

In an example, a universal channel occupancy signal (UCOS) may be used, which is a signal understood by all devices. The UCOS may carry simple quantized channel occupancy duration information. For example, the channel occupancy time may be quantized to four levels {t1, t2, t3, t4}, which may be explicitly or implicitly signalled by the UCOS. The quantized level values may or may not be uniformly distributed. A WTRU may detect a UCOS and determine the channel occupancy time duration. If the WTRU is not the intended receiver of the UCOS, it may a set channel occupancy duration and not transmit during the duration.

Examples of a UCOS format may include a preamble followed by modulated symbol(s) and/or a set of sequences which may have good auto-correlation and cross-correlation property. In the case of the preamble followed by modulated symbol(s), the preamble may be a fixed sequence with good auto-correlation property. The channel occupancy duration information may be carried by the modulated symbol(s). In the case of the set of sequences, the set of sequences may have good auto-correlation and cross-correlation properties, and/or the sequence may map to one quantized channel occupancy duration level. The UCOS may be understood by all the devices, including future 3GPP devices and WiFi devices.

Although the features and elements of the present invention are described in the preferred embodiments in particular combinations, each feature or element can be used alone without the other features and elements of the preferred embodiments or in various combinations with or without other features and elements of the present invention.

Although the solutions described herein consider New Radio (NR), 5G or LTE, LTE-A specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) configured to perform receiver assisted channel access during a channel occupancy time (COT), the WTRU comprising:
   a transceiver; and
   a processor, wherein
   the transceiver and the processor are configured to:
   determine that the WTRU is a member of a first group;
   receive a first preamble in a first time slot set of the COT;
   determine a group associated with the first time slot set based on the first preamble;
   on a condition that the group associated with the first time slot set is the first group, monitor a channel for a first information indicating a request to send in the first time slot set; and
   on a condition that the first information indicating the request to send is received:
      perform a first listen-before-talk (LBT) on the channel; and
      on a condition that the first LBT is successful, transmit a first information indicating the WTRU is clear to send on the channel and access the channel in the first time slot set for uplink or downlink communications.

2. The WTRU of claim 1, wherein the transceiver and the processor are further configured to receive COT configuration information for the COT at a beginning of the COT.

3. The WTRU of claim 2, wherein the transceiver and the processor are configured to determine that the WTRU is a member of the first group based on group membership information received from a gNB.

4. The WTRU of claim 1, wherein the COT is a multi-slot COT.

5. The WTRU of claim 1, wherein the COT is partitioned into a plurality of non-overlapping time slot sets corresponding to a plurality of nested groups.

6. The WTRU of claim 5, wherein the WTRU is also a member of at least a second group nested in the first group.

7. The WTRU of claim 6, wherein the transceiver and the processor are further configured to, on a condition that the first LBT is unsuccessful:
   monitor the channel in a second time slot set of the COT;
   receive a second preamble in the second time slot set;
   determine a group associated with the second time slot set based on the second preamble;
   on a condition that the group associated with the second time slot set is the second group, monitor the channel for a second information indicating a request to send in the second time slot set; and
   on a condition that the second information indicating the request to send is received:
      perform a second LBT on the channel; and
      on a condition that the second LBT is successful, transmit a second information indicating the WTRU is clear to send on the channel and accessing the channel in the second time slot set for uplink or downlink communications.

8. The WTRU of claim 1, wherein the transceiver and the processor are further configured to, on a condition that the transceiver receives data is received in the first time slot set when accessing the channel in the first time slot set, enter a power saving mode until a subsequent COT.

9. The WTRU of claim 1, wherein the transceiver and the processor are further configured to, on a condition that the WTRU is not a member of the group associated with the first time slot set, enter a power saving mode until a second time slot set.

10. The WTRU of claim 1 configured as a high priority WTRU.

11. A method, performed by a wireless transmit/receive unit (WTRU), for receiver assisted channel access during a channel occupancy time (COT), the method comprising:
   determining that the WTRU is a member of a first group;
   receiving a first preamble in a first time slot set of the COT;
   determining a group associated with the first time slot set based on the first preamble;
   on a condition that the group associated with the first time slot set is the first group, monitoring a channel for a first information indicating a request to send in the first time slot set; and
   on a condition that the first information indicating the request to send is received:
      performing a first listen-before-talk (LBT) on the channel; and
      on a condition that the first LBT is successful, transmitting a first information indicating the WTRU is clear to send on the channel and accessing the channel in the first time slot set for uplink or downlink communications.

12. The method of claim 11, further comprising receiving COT configuration information for the COT at a beginning of the COT.

13. The method of claim 11, wherein the determining that the WTRU is a member of the first group is based on group membership information received from a gNB.

14. The method of claim 11, wherein the COT is a multi-slot COT.

15. The method of claim 11, wherein the COT is partitioned into a plurality of non-overlapping time slot sets corresponding to a plurality of nested groups.

16. The method of claim 15, wherein the WTRU is also a member of at least a second group nested in the first group.

17. The method of claim 16, further comprising, on a condition that the first LBT is unsuccessful:
   monitoring the channel in a second time slot set of the COT;
   receiving a second preamble in the second time slot set;
   determining a group associated with the second time slot set based on the second preamble;
   on a condition that the group associated with the second time slot set is the second group, monitoring the channel for a second information indicating a request to send in the second time slot set;

on a condition that the second information indicating the request to send is received:

performing a second LBT on the channel; and on a condition that the second LBT is successful, transmitting a second CTS information indicating the WTRU is clear to send on the channel and accessing the channel in the second time slot set for uplink or downlink communications.

18. The method of claim 11 further comprising, on a condition that data is received in the first time slot set when accessing the channel in the first time slot set, entering a power saving mode until a subsequent COT.

19. The method of claim 11 further comprising, on a condition that the WTRU is not a member of the group associated with the first time slot set, entering a power saving mode until a second time slot set.

20. The method of claim 11, wherein the WTRU is a high priority WTRU.

\* \* \* \* \*